United States Patent [19]
Agabra et al.

[11] Patent Number: 6,126,075
[45] Date of Patent: Oct. 3, 2000

[54] OPTICAL CODE READER INCLUDING CIRCUITRY FOR PROCESSING THE READ SYMBOLOGY

[75] Inventors: David S. Agabra, Redondo Beach; Mark S. Knighton, Santa Monica; Douglas Logan, Yorba Linda, all of Calif.

[73] Assignee: Motorola, Inc., Schaumburg, Ill.

[21] Appl. No.: 09/099,088

[22] Filed: Jun. 17, 1998

Related U.S. Application Data

[60] Provisional application No. 60/087,906, Jun. 4, 1998.

[51] Int. Cl.$^7$ ........................................... G06K 7/10
[52] U.S. Cl. ............... 235/454; 235/462.16; 235/462.18; 235/462.45; 235/472.01
[58] Field of Search ............................... 235/454, 462.01, 235/462.15, 462.18, 462.25, 462.26, 462.31, 462.45, 472.01

[56] References Cited

U.S. PATENT DOCUMENTS

| | | | |
|---|---|---|---|
| 4,387,297 | 6/1983 | Swartz et al. | 235/462.01 |
| 4,575,625 | 3/1986 | Knowles | 235/467 |
| 4,933,538 | 6/1990 | Heiman et al. | 235/462.01 |
| 5,142,550 | 8/1992 | Tymes | 375/1 |
| 5,591,953 | 1/1997 | Rockstein et al. | 235/472.01 |
| 5,602,379 | 2/1997 | Uchimura et al. | 235/472.01 |
| 5,629,733 | 5/1997 | Youman et al. | |
| 5,640,193 | 6/1997 | Wellner | |
| 5,664,110 | 9/1997 | Green et al. | |
| 5,819,241 | 10/1998 | Reiter | |
| 5,869,819 | 2/1999 | Knowles et al. | |
| 5,905,248 | 5/1999 | Russell et al. | |
| 5,905,251 | 5/1999 | Knowles | |
| 5,918,214 | 6/1999 | Perkowski | |

FOREIGN PATENT DOCUMENTS

| | | |
|---|---|---|
| WO 97/01137 | 1/1997 | WIPO |
| WO 98/20411 | 5/1998 | WIPO |

OTHER PUBLICATIONS

Zuckerman, "It's a Brand New E–Mail, Companies Want to Turn Computers into Postage Meters", *The New York Times*, Monday, Apr. 28, 1997.

*Primary Examiner*—Donald Hajec
*Assistant Examiner*—Daniel St. Cyr
*Attorney, Agent, or Firm*—James E. Gauger

[57] ABSTRACT

An amplifier has an input responsive to an optical detector. An analog-to-digital converter is responsive to an output of the amplifier. A processor activates an optical emitter, and reads a first sample from the analog-to-digital converter. Upon determining that the first sample is less than a first threshold, the processor applies a first signal to a control input of the amplifier for a first duration. The processor reads a second sample from the analog-to-digital converter. Upon determining that the second sample is greater than a second threshold, the processor applies a second signal to the control input for a second duration less than the first duration.

33 Claims, 22 Drawing Sheets

Microfiche Appendix Included
(13 Microfiche, 118 Pages)

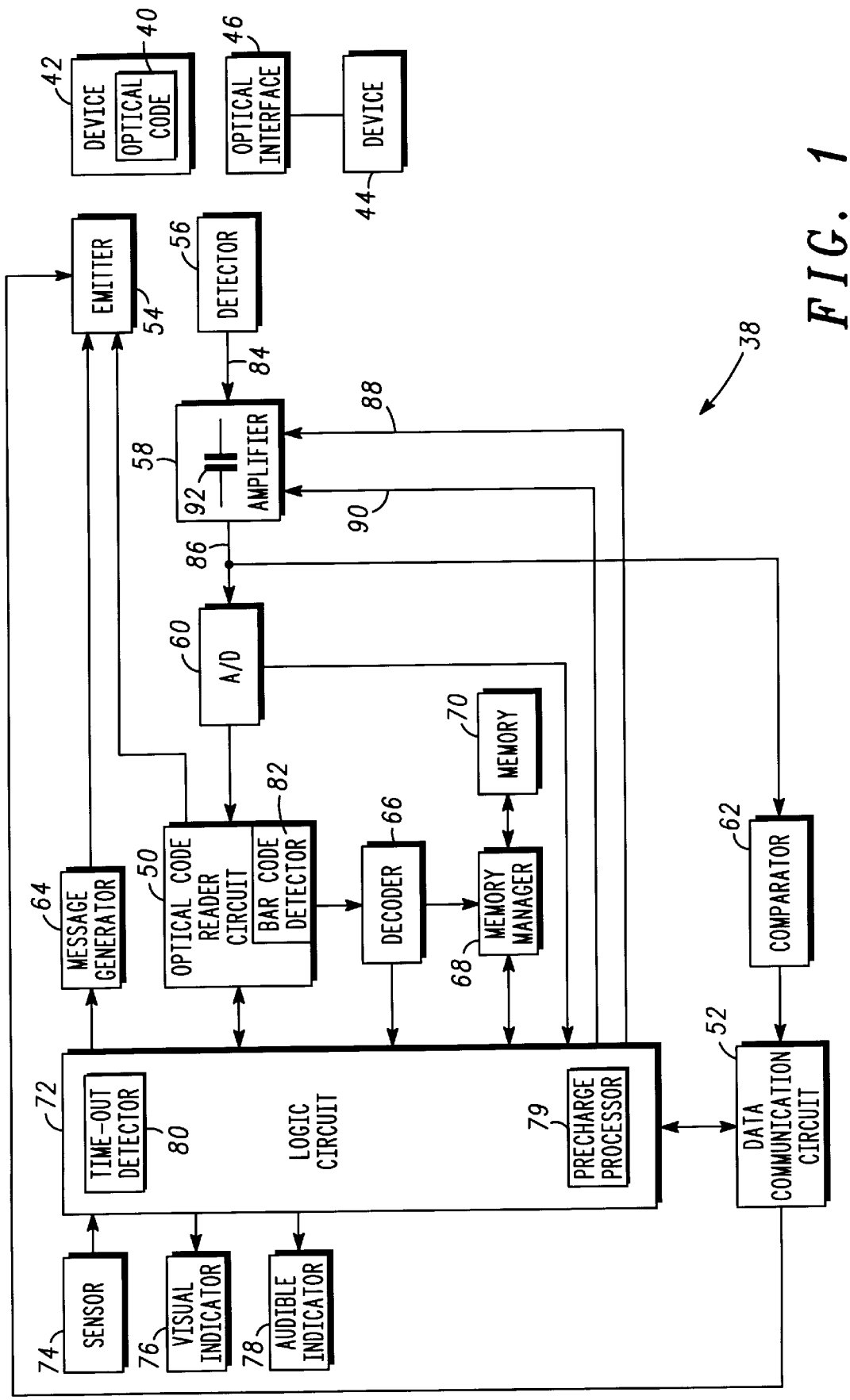

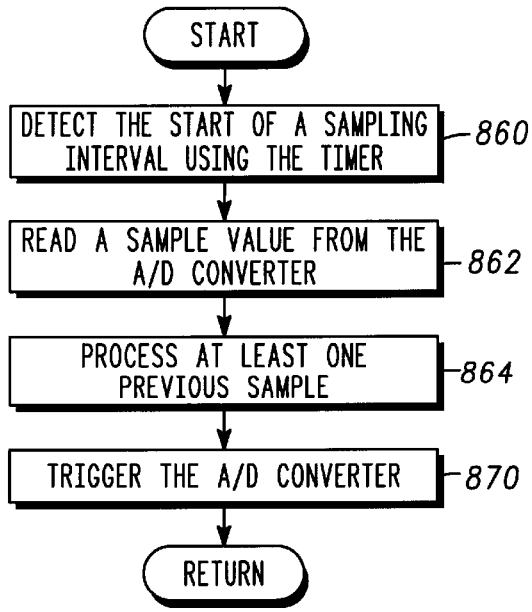

FIG. 24

```
CASE FIND_DARK_MIN                  900
IF THE SIGNAL IS GETTING DARKER
{                                        902
        IF (ABS(DIFFERENCE)<DARK THRESHOLD)
        904—BREAK;
        IF (ABS(DIFFERENCE)>MAXDIFFER) —906
        {
                MAXDIFFER=ABS(DIFFERENCE)    ⎤
                LIGHT_TO_DARK=SAMPLENUMBER   ⎬ 910
                LAST DIFFERAT=SAMPLENUMBER   ⎦
        }
        ELSE                           912
        IF (ABS(DIFFERENCE)=MAXDIFFER)
                LASTDIFFERAT=SAMPLENUMBER
        BREAK;                              914
}            916
ELSE                                920
IF (DIFFERENCE<=LIGHT THRESHOLD)
    922—BREAK;                          924
LIGHT_TO_DARK=(LASTDIFFERAT+LIGHT_TO_DARK)/2
IF A PREVIOUS DARK_TO_LIGHT TRANSITION IS KNOWN   926
        STORE WIDTH VALUE OF (LIGHT_TO_DARK-DARK_TO_LIGHT)

SIGNALSTATE=FIND_LIGHT_MAX  ⎤
LENGTHSTATE=0               ⎥
MAXDIFFER=ABS(DIFFERENCE)   ⎬ 930
DARK_TO_LIGHT=SAMPLENUMBER  ⎥
LASTDIFFERAT=SAMPLE NUMBER  ⎦
BREAK;
```

FIG. 25

```
CASE FIND_LIGHT_MAX                    940
IF THE SIGNAL IS GETTING LIGHTER
{                                              942
        IF (ABS(DIFFERENCE)<LIGHTTHRESHOLD)
         944—BREAK;
        IF (ABS(DIFFERENCE)>MAXDIFFER) —946
        {
                MAXDIFFER=ABS(DIFFERENCE)   ⎤
                DARK_TO_LIGHT=SAMPLENUMBER  ⎬-950
                LASTDIFFERAT=SAMPLENUMBER   ⎦
        }
        ELSE                           952
        IF (ABS(DIFFERENCE)=MAXDIFFER)
                LASTDIFFERAT=SAMPLENUMBER
        BREAK;                              954
}                  956
ELSE                      960
IF (ABS(DIFFERENCE<=DARK THRESHOLD)
    962—BREAK;                              964
DARK_TO_LIGHT=(LASTDIFFERAT+DARK_TO_LIGHT)/2
IF A PREVIOUS LIGTH_TO_DARK TRANSITION IS KNOWN   966
        STORE WIDTH VALUE OF (DARK_TO_LIGHT-LIGHT_TO_DARK)

SIGNALSTATE=FIND_DARK_MIN   ⎤
LENGTHSTATE=0               ⎬-970
MAXDIFFER=ABS(DIFFERENCE)   ⎟
LIGHT_TO_DARK=SAMPLENUMBER  ⎟
LASTDIFFERAT=SAMPLE NUMBER  ⎦
BREAK;
```

*FIG. 26*

```
                                                    1000
 1002 ACTIVATE THE EMITTER WITH LOW INTENSITY
      DISABLE LOW_GAIN
         INITIALIZE THE A/D CONVERTER — 1004
 1010 LASTSAMPLEWASHIGH=TRUE
      MBYTECOUNT=128              1006
 1011—MLOOPCOUNT=5000
      DO
      {                                             1012
      WAIT ABOUT 60 MICROSECONDS FOR CIRCUITRY TO SETTLE
 1014—GET A SAMPLE FROM THE A/D CONVERTER
      IF THE SAMPLE IS LESS THAN A LOWER THRESHOLDS—1016
      {
              IF LASTSAMPLEWASHIGH IS TRUE
                  MBYTECOUNT /=2—1020
              LASTSAMPLEWASHIGH=FALSE—1022            1024
              IF (MBYTECOUNT !=0)
                  SET PRECHARGE LOW FOR (MBYTECOUNT * 20 MICROSECONDS)
                  DISABLE PRECHARGE—1026
      }
      ELSE                                          1032
      IF THE SAMPLE IS GREATER THAN AN UPPER THRESHOLD
      {
              IF LASTSAMPLEWASHIGH IS FALSE
                  MBYTECOUNT/=2—1034
              LASTSAMPLEWASHIGH=TRUE— 1036            1040
                  IF (MBYTECOUNT !=0)
                      SET PRECHARGE HIGH FOR (MBYTECOUNT * 20 MICROSECONDS)
                      DISABLE PRECHARGE—1042
 1044 {
      ELSE THE SAMPLE IS WITHIN THE BOUNDS OF THE LOWER AND UPPER THRESHOLDS
              BREAK
      } WHILE ((MBYTECOUNT !=0) AND (--MLOOPCOUNT !=0))
                                                         1030
          DISABLE PRECHARGE  ] 1031
          DISABLE LOW_GAIN
```

*FIG. 28*

```
IF THE BIT VALUE IS 0  /1050
{
    1052—SET LOW_GAIN HIGH                          1054
           ACTIVATE THE EMITTER WITH HIGH INTENSITY
    1056—MAINTAIN THE BIAS_CONTROL ON
           WAIT FOR ABOUT 3/16 BIT TIME—1060
1062 {
    DEACTIVATE THE HIGH INTENSITY TO ILLUMINATE THE EMITTER WITH LOW INTENSITY
    DISABLE THE LOW_GAIN
    RETURN                  1064
```

FIG. 29

```
                                         1080
      START AN A/D CONVERSION
1082—WAIT 1/4 BIT TIME
      IF THE A/D CONVERSION IS COMPLETE
      {
      1084—READ A/D SAMPLE                1086
            MAINTAIN THE BIAS_CONTROL ON
      1090—DEACTIVATE THE HIGH INTENSITY TO ILLUMINATE THE EMITTER
            WITH LOW INTENSITY
      1092—IF THE SAMPLE IS GREATER THAN THE UPPER THRESHOLD  1094
              SET PRECHARGE HIGH FOR ABOUT 3 MICROSECONDS
      1096—IF THE SAMPLE IS LESS THAN THE LOWER THRESHOLD
              SET PRECHARGE LOW FOR ABOUT 3 MICROSECONDS
      1102—DISABLE PRECHARGE                                   1100
      }
      RETURN
```

FIG. 30

OPTICAL CODE READER INCLUDING CIRCUITRY FOR PROCESSING THE READ SYMBOLOGY

The present application is based on prior US Provisional application No. 60/087,906, filed on Jun. 4, 1998, which is hereby incorporated by reference, and priority thereto for common subject matter is hereby claimed.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MICROFICHE APPENDIX

This application includes a non-printed computer program listing which is disclosed in the form of a microfiche appendix as provided for in 37 CFR 1.96, consisting of 36 slides and 118 frames.

TECHNICAL FIELD

The present invention relates to optical data readers such as bar code readers.

BACKGROUND OF THE INVENTION

Many forms of handheld devices having an integrated optical data reader are presently available. These forms include a wand form, a gun form, a card form, and a handheld computer form.

Wand-shaped devices are typically sized and shaped like a cigar. An optical data reader such as a bar code reader is accessible at an end of the device. The wand-shaped device is held like a pencil for swiping the optical data reader across a printed code such as a bar code. Data read by the optical data reader are transmitted from the wand-shaped device to a computer via either a wireline connection or a radio frequency interface.

Gun-type devices have a handle for holding like a gun. The device includes an optical data reader such as a scanning bar code reader. An end user aims the optical data reader toward a printed code. The optical data reader is activated and deactivated by a trigger promimate to the handle. Data read by a gun-type device are typically transmitted to a computer via a wireline connection.

Examples of a card-shaped optical code readers are described in U.S. Pat. No. 4,721,849 to Davis et al. and U.S. Pat. No. 4,801,789 to Davis. U.S. Pat. No. 4,721,849 discloses a card-shaped reader having an input/output connector for interfacing with a host computer.

The handheld computer form has a bar code reader accessible at an end of a single housing. The single housing supports a keypad and a display in a manner similar to a handheld calculator.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 is a block diagram of an embodiment of an apparatus in accordance with the present invention;

FIG. 24 is a flow chart of an embodiment of a sampling process;

FIGS. 25 and 26 illustrate pseudo-code representations of embodiments of methods of detecting a width-between-edges;

FIG. 28 is a pseudo-code representation of an embodiment of a method of preparing the amplifier for operation;

FIG. 29 is a flow chart of an embodiment of a method of transmitting a bit within a message;

FIG. 30 is a pseudo-code representation of an embodiment of a method of fine tuning the amplifier when transmitting an IrDA stop bit;

DETAILED DESCRIPTION OF PREFERRED EMBODIMENTS

Figure 3:
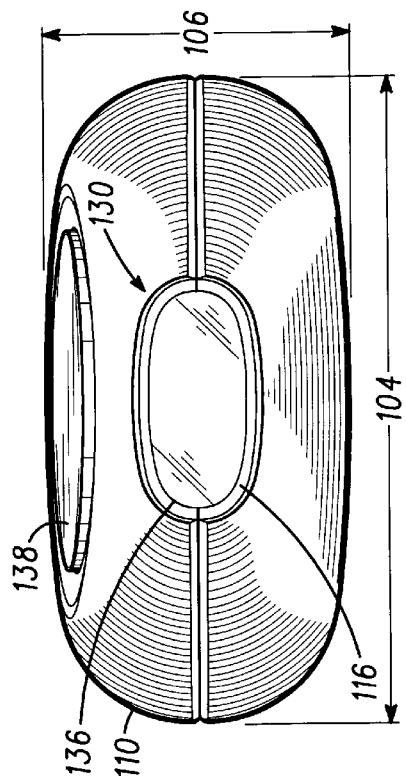
FIG. 3 is an end view of the first embodiment of the apparatus.

FIG. 1 is a block diagram of an embodiment of an apparatus 38 in accordance with the present invention. The apparatus 38 is capable of reading an optical code 40 from an external device 42. In general, the external device 42 can be either passive or active. An example of a passive external device includes a substrate, such as paper or plastic, which supports the optical code 40. The optical code 40 can include a bar code, textual data, graphical data, or printed data, for example. Active external devices can include electrically-controllable light-emitting elements, light-absorbing elements, and/or light-reflecting elements to generate the optical code 40. Examples of active external devices include, but are not limited to, cathode ray tubes, light-emitting displays, liquid crystal displays, and other electrically-activated display devices.

The apparatus 38 is also capable of communicating optical signals with an external device 44 having an optical interface 46. Examples of the external device 44 include, but are not limited to, another like apparatus, a notebook computer, a palmtop computer, a personal digital assistant, and other devices having an optical interface. Preferably, the optical interface 46 comprises an infrared interface such as an IrDA (Infrared Data Association) interface.

By having the ability to provide dual modes of data transmission and optical code reading, the apparatus 38 may be referred to as a transreader.

The apparatus 38 comprises an optical code reader circuit 50, a data communication circuit 52, an emitter 54, a detector 56, an amplifier 58, a multi-bit digital-to-analog converter 60, a comparator 62, a message generator 64, a decoder 66, a memory manager 68, a memory 70, a logic circuit 72, a sensor 74, a visual indicator 76, an audible indicator 78, and a pre-charge processor 79.

Preferably, the optical code reader circuit 50, the data communication circuit 52, the multi-bit digital-to-analog converter 60, the message generator 64, the decoder 66, the memory manager 68, the logic circuit 72, and the pre-charge processor 79 are provided by a single integrated circuit. The single integrated circuit can include either a programmable microcontroller or a custom integrated circuit.

The emitter 54 is used to illuminate the optical code 40 and to transmit optical signals to the optical interface 46. Preferably, the emitter 54 comprises a light-emitting component such as a light-emitting diode. More preferably, the emitter 54 comprises an infrared light-emitting diode. It is noted, however, that emitter 54 can comprise alternative devices. It is further noted that the emitter 54 can include one or more emitting elements.

The detector 56 is used to read the optical code 40 and to receive optical signals from the optical interface 46. Preferably, the detector 56 comprises an optoelectronic detector such as a phototransistor or a photodiode. It is noted, however, that detector 56 can comprise alternative devices. It is further noted that the detector 56 can include one or more detecting elements.

The amplifier 58 amplifies signals from the detector 56. Additionally, the amplifier 58 can perform additional signal processing to signals from the detector 56.

The multi-bit analog-to-digital converter 60 converts analog signals from the amplifier 58 to a digital representation. The digital representation, in general, is comprised of at least two bits per sample. Preferably, the digital representation is comprised of eight bits per sample. It is noted, however, that the analog-to-digital converter 60 may provide only a single bit per sample in alternative embodiments.

The comparator 62 converts analog signals from the amplifier 58 to a digital signal readable by the data communication circuit 52. Preferably, the comparator 62 is unused by the optical code reader circuit 50 when reading the optical code 40.

The memory 70 stores data associated with the optical code 40. Preferably, the memory 70 comprises a non-volatile memory device to maintain the data absent of a powering signal being applied thereto. It is noted, however, that the memory 70 can comprise alternative memory devices.

The sensor 74 is operative to sense at least one user action. Preferably, the sensor 74 comprises a switch to sense a user-initiated depression and a user-initiated release of a button. It is noted, however, that alternative sensors can be used to sense alternative user actions.

The visual indicator 76 provides visible indications based upon a status of the apparatus 38. Preferably, the visual indicator 76 includes a light-emitting component such as a light-emitting diode to provide visible indications of light. It is noted, however, that alternative visual indicators can be used to provide visible indications.

The audible indicator 78 provides audible indications based upon a status of the apparatus 38. Preferably, the audible indicator 78 includes either a buzzer, a speaker with a tone generator, or another audible transducer. It is noted, however, that alternative audible indicators can be used to provide audible indications.

In accordance with a first aspect of the present invention, the message generator 64 is responsive to the sensor 74 to generate a first message in response to sensing a first user action. Preferably, the first user action comprises a user-initiated depression of a switch.

The emitter 54 is responsive to the message generator 64 to optically transmit the first message. For purposes of illustration and example, at or about the time of the first user action, the emitter 54 and the detector 56 are considered to be optically proximate to the optical code 40 and optically distant from the optical interface 46. By optically proximate, it is meant that the emitter 54 illuminates at least a portion of the optical code 40 and/or the detector 56 senses at least a portion of the optical code 40. By optically distant, it is meant that signals from the emitter 54 are undetectable or uninterpretable by the optical interface 46, and/or signals from the optical interface 46 are undetectable or uninterpretable by the detector 56.

The logic circuit 72 is responsive to the detector 56 to detect non-receipt of a valid response to the first message. In general, non-receipt of the valid response can comprise either receipt of an invalid response to the first message or non-receipt of any response. The valid response is one which would be communicated by the external device 44, using the optical interface 46, in response to receiving the first message. Since the optical interface 46 is initially considered to be optically distant from the emitter 54 and the detector 56, the valid response is non-received by the detector 56. The logic circuit 72 detects non-receipt of the valid response within a time period after the first message is optically transmitted.

The optical code reader circuit 50 is responsive to the logic circuit 72 to become active in response to detecting non-receipt of the valid response. Here, the emitter 54 is responsive to the optical code reader circuit 50 to illuminate the optical code 40, and the optical code reader circuit 50 is responsive to the detector 56 to read the optical code 40. The memory 70 stores data associated with the optical code 40. Preferably, the data comprises a decoded representation of the optical code 40 as determined by the decoder 66.

Preferably, the optical code reader circuit 50, the emitter 54, the detector 56, and the decoder 66 cooperate to provide a bar code reader to read a bar code from the external device 42. Alternatively, the optical code reader circuit 50, the emitter 54, the detector 56, and the decoder 66 can cooperate to provide an optical text reader to read text from the external device 42. As another alternative, the optical code reader circuit 50, the emitter 54, the detector 56, and the decoder 66 can cooperate to provide an optical imaging scanner to read and digitize text and graphics from the external device 42.

After reading the optical code 40, the message generator 64 is responsive to the sensor 74 to generate a second message in response to a second user action. Preferably, the second user action comprises a user-initiated depression of the switch.

The emitter 54 is responsive to the message generator 64 to optically transmit the second message. Preferably, the first message and the second message are equivalent. For purposes of illustration and example, at or about the time of the second user action, the emitter 54 and the detector 56 are considered to be optically distant from the optical code 40 and optically proximate to the optical interface 46. By optically distant, it is meant that the optical code 40 is not significantly illuminated by the emitter 54 and/or is undetected by the detector 56. By optically proximate, it is meant that the optical interface 46 can optically detect signals from the emitter 54, and/or the detector 56 can optically detect signals from the optical interface 46.

The logic circuit 72 is responsive to the detector 56 to detect receipt of a valid response to the second message. The valid response is transmitted by the external device 44, using the optical interface 46, in response to receiving the second message. The logic circuit 72 detects receipt of the valid response within a time period after the second message is optically transmitted.

The data communication circuit 52 is responsive to the logic circuit 72 to become active in response to detecting receipt of the valid response. Here, the emitter 54 is responsive to the data communication circuit 52 to communicate a third message based upon the data stored by the memory 70. Further, the data communication circuit 52 is responsive to the detector 56 to receive a fourth message from the optical interface 46 to acknowledge receipt of the third message.

The first aspect affords many advantages. One advantage is that the apparatus 38 automatically determines, in response to a user action received by the sensor 74, whether to read the optical code 40 or to communicate data with the external device 44. In a preferred embodiment, a single switch can be used to command an optical code reading mode and a data communication mode.

In accordance with a second aspect of the present invention, the optical code reader circuit 50 is responsive to the sensor 74 to read a first optical code in response to a first user action and to read a second optical code in response to a second user action. Preferably, the first optical code comprises a first bar code, and the second optical code comprises a second bar code. In this case and other cases, the emitter 54 is responsive to the optical code reader circuit 50 to illuminate the first optical code and the second optical code. The optical code reader circuit 50 is responsive to the detector 56 to read the first optical code and the second optical code.

The memory 70 is responsive to the optical code reader circuit 50 to store first data associated with the first optical code and second data associated with the second optical code. The data communication circuit 52 communicates with the memory 70 to optically transmit, using the emitter 54, a first message based upon the first data. The data communication circuit 52 and the emitter 54 are responsive to the sensor 74 to optically transmit the first message in response to a third user action. Preferably, each of the first user action, the second user action, and the third user action comprises a user-initiated depression of the switch.

For purposes of illustration and example, the emitter 54 and the detector 56 are optically proximate to the optical interface 46 at the time of transmitting the first message. It is also considered that the first message is received by optical interface 46 and decoded by the external device 44.

In response to determining that the first message passes an error check, the external device 44 commands the optical interface 46 to optically transmit an acknowledge message. The acknowledge message is received by the detector 56. The logic circuit 72 is responsive to the detector 56 to detect the receipt of the acknowledge message.

After transmitting the first message, the data communication circuit 52 communicates with the memory 70 to optically transmit, using the emitter 54, a second message based upon the second data. For purposes of illustration and example, it is considered that optical communication between the apparatus 38 and the optical interface 46 is corrupted at or about at the time of communicating the second message. As a result, an acknowledge message associated with the second message is not received by the detector 56. The logic circuit 72 is responsive to the detector 56 to detect non-receipt of an acknowledge message associated with the second message. The logic circuit 72 detects non-receipt of the acknowledge message associated with the second message within a time period after transmitting the second message.

Upon detecting receipt of the acknowledge message associated with the first message, the logic circuit 72 cooperates with the memory 70 to delete the first data. Upon detecting non-receipt of an acknowledge message associated with the second message, the logic circuit 72 cooperates with the memory 70 to maintain storage of the second data.

The second aspect affords many advantages. One advantage is that unacknowledged data remains stored by the apparatus 38, and is not deleted from the memory 70. The unacknowledged data can be communicated to the external device 44 in a subsequent transmission attempt. The subsequent transmission attempt can be initiated by a subsequent user action sensed by the sensor 74 when the emitter 54 and the detector 56 are optically proximate to the optical interface 46.

In accordance with a third aspect of the present invention, the detector 56 is accessible at a reading end of the apparatus 38. Using the detector 56, the apparatus 38 reads the optical code 40 from the reading end. The optical code reader circuit 50 provides data based upon the optical code 40. Preferably, the emitter 54 illuminates the optical code 40 from the reading end of the apparatus 38.

The decoder 66 is responsive to the optical code reader circuit 50 to decode the optical code 40 based upon the data. Preferably, the decoder 66 comprises a bar code decoder to decode the optical code 40 comprising a bar code.

The visual indicator 76 is responsive to the decoder 66 to provide at least one visible indication proximate to the reading end. In response to detecting a valid decode by the decoder 66, the visual indicator 76 provides a first visible indication. Preferably, the first visible indication comprises a single flash of illumination.

The memory manager 68 determines if sufficient memory space is available in the memory 70 to store data associated with the optical code 40. In response to the memory manager 68 detecting an insufficient memory space condition, the visual indicator 76 provides a second visible indication. Preferably, the second visible indication comprises a series of flashes of illumination. The second visible indication indicates that the data associated with the optical code 40 is not stored in the memory 70.

The logic circuit 72 provides a time-out detector 80 to detect a time period that a bar code detector 82 does not detect an edge of a bar code based upon the data. In response to the time-out detector 80 detecting the time period, the visual indicator 76 provides a third visible indication. Preferably, the third visible indication comprises a series of flashes of illumination.

The third aspect affords many advantages. One advantage is that an end user, upon attempting to read the optical code 40 using the apparatus 38, can visually determine a status of the apparatus 38 without significantly moving his/her eyes from the reading end. For example, the end user can visually determine that a first attempt to read a first optical code was unsuccessful by viewing the third visible indication. Thereafter, the end user can initiate a second attempt to read a second optical code, which may or may not be equivalent to the first optical code. The end user can visually determine that the second attempt is successful by viewing the first visible indication. The end user can visually determine an insufficient memory space condition if the second visible indication follows the first visible indication.

In accordance with a fourth aspect of the present invention, the optical code reader circuit 50 includes the bar code detector 82. The bar code detector 82 is responsive to the multi-bit analog-to-digital converter 60 to detect bars and spaces in the optical code 40. The multi-bit analog-to-digital converter 60 is coupled to the optical detector 56 by the amplifier 58. Advantageously, the multi-bit analog-to-digital converter 60 is responsive to the detector 56 without an intervening comparator.

The multi-bit analog-to-digital converter 60 provides a plurality of sample values sensed by the detector 56 and processed by the amplifier 58. The bar code detector 82 processes the plurality of sample values to generate a plurality of processed values. Preferably, each of the plurality of processed values is dependent upon a difference between an associated pair of the sample values.

The bar code detector 82 detects edges in a bar code based upon the processed values. Preferably, each edge is detected based upon at least one associated local optimum of the processed values. It is noted that a local optimum can include either a local maximum or a local minimum in the time sequence of processed values.

The bar code detector 82 determines and stores an associated width value for each adjacent pair of edges. The decoder 66 is responsive to the bar code detector 82 to decode the bar code based upon a plurality of width values.

Of particular interest are cases in which the bar code detector 82 determines a width value between an adjacent pair of edges as follows. The bar code detector 82 detects a first edge of a bar based upon a first local optimum and a second local optimum of the processed values. The bar code detector 82 determines a first edge location based upon a first count value associated with the first local optimum and a second count value associated with the second local optimum. Preferably, the first count value is based upon a first sample number associated with the first local optimum, and the second count value is based upon a second sample number associated with the second local optimum. It is also preferred that the edge location be based upon an average of the first count value and the second count value.

The bar code detector 82 detects a second edge of the bar based upon a third local optimum and a fourth local optimum of the processed values. The bar code detector 82 determines a second edge location based upon a third count value associated with the third local optimum and a fourth count value associated with the fourth local optimum. Preferably, the third count value is based upon a third sample number associated with the third local optimum, and the fourth count value is based upon a fourth sample number associated with the fourth local optimum. It is also preferred that the second edge location be based upon an average of the third count value and the fourth count value.

The width value is determined by determining a difference between the second edge location and the first edge location.

The fourth aspect affords many advantages. One advantage is that the apparatus 38 performs edge detection using a software process without an intervening hardware comparator.

In accordance with a fifth aspect of the present invention, the amplifier 58 has an input 84, an output 86, and a gain control input 88. The input 84 is responsive to the detector 56. The optical code reader circuit 50 and the data communication circuit 52 are responsive to the output 86. The data communication circuit 52 is responsive to the output 86 via the comparator 62.

The gain control input 88 of the amplifier 58 is responsive to the optical code reader circuit 50 during an optical code reading mode. During the optical code reading mode, the amplifier 58 is responsive to the optical code reader circuit 50 to provide a first gain. To direct the amplifier 58 to provide the first gain, a first signal is applied to the gain control input 88. Preferably, the logic circuit 72 is the source of the first signal.

After applying the first signal, the amplifier 58 amplifies a signal from the detector 56, using the first gain, to produce a first amplified signal at the output 86. Based upon the output 86 of the amplifier 58, a step of reading the optical code 40 is performed. The first gain can be provided throughout a time period for reading the optical code 40.

The gain control input 88 is responsive to the data communication circuit 52 during a data communication mode. During at least a portion of the data communication mode, the amplifier 58 is responsive to the data communication circuit 52 to provide a second gain less than the first gain. To direct the amplifier 58 to provide the second gain, a second signal is applied to the gain control input 88. Preferably, the logic circuit 72 is the source of the second signal.

After applying the second signal, the emitter 54 is used to emit a first optical signal. While emitting the first optical signal, the amplifier 58 amplifies a signal from the detector 56, using the second gain, to produce a second amplified signal at the output 86.

After emitting the first optical signal, a step of emitting a second optical signal is performed. The second optical signal has a lesser intensity than the first optical signal. Typically, the first optical signal and the second optical signal are used to transmit a message in a binary fashion. While emitting the second optical signal, a third signal is applied to the gain control input 88 to direct the amplifier 58 to provide the first gain. Hence, while emitting the second optical signal, the amplifier 58 amplifies a signal from the detector 56, using the first gain, to produce a third amplified signal at the output 86.

The gain of the amplifier 58 is varied to compensate or feedback from illumination by the emitter 54 while transmitting data. Preferably, the emitter 54 is capable of generating either a high intensity signal or a low intensity signal. The data communication circuit 52 directs the emitter 54 to repeatedly switch between the two intensities to transmit the message in accordance with a communication protocol. Preferably, the communication protocol is based upon an IrDA protocol.

In the data communication mode, the amplifier 58 provides the first gain during at least a portion, and preferably a majority, of the time that the emitter 54 is generating the low intensity signal. During a remaining portion of the data communication mode, including when the emitter 54 is generating the high intensity signal, the amplifier 58 provides the second gain.

In accordance with a sixth aspect of the present invention, the amplifier 58 includes a control input 90 and a capacitor 92. The capacitor 92 AC couples the detector 56 to an amplification stage in the amplifier 58. The capacitor 92 has a first terminal coupled to the input 84 and a second terminal coupled to the control input 90 by a resistor.

The control input 90 is responsive to the pre-charge processor 79. The pre-charge processor 79 is responsive to the multi-bit analog-to-digital converter 60 and to the data communication circuit 52. The pre-charge processor 79 reads a first sample from the multi-bit analog-to-digital converter 60 while the emitter 54 is cooperating with the data communication circuit 52 to transmit a message. The message, for example, can include a plurality of bits based upon data stored by the memory 70.

In response to determining that the first sample is beyond a first threshold, the pre-charge processor 79 applies a first signal to the control input 90. Preferably, the pre-charge processor 79 applies the first signal for a predetermined time duration. Prior to completion of the message, the pre-charge processor 79 terminates the first signal. Preferably, the pre-charge processor 79 initiates applying the first signal and terminates the first signal during transmission of a first bit within the message. More preferably, the first bit comprises a stop bit such as an IrDA stop bit.

After terminating the first signal, the pre-charge processor 79 provides a higher measure of impedance to the control input 90 in comparison to a measure of impedance associated with the first signal. The pre-charge processor 79 also applies the higher impedance to the control input 90 prior to applying the first signal. Preferably, the higher impedance is provided by tri-stating an output of the pre-charge processor 79.

The pre-charge processor 79 reads a second sample from the multi-bit analog-to-digital converter 60 while the emitter 54 is cooperating with the data communication circuit 52 to transmit the message. In response to determining that the second sample is beyond a second threshold, the pre-charge processor 79 applies a second signal to the control input 90.

Preferably, the pre-charge processor 79 applies the second signal for a predetermined time duration. Prior to completion of the message, the pre-charge processor 79 terminates the second signal. Preferably, the pre-charge processor 79 initiates applying the second signal and terminates the second signal during transmission of a second bit within the message. More preferably, the second bit comprises a stop bit such as an IrDA stop bit. After terminating the second signal, the pre-charge processor 79 provides the higher impedance to the control input 90 in comparison to an impedance associated with the second signal.

Two cases to illustrate the sixth aspect are described as follows. In a first case, it is considered that the first threshold is greater than or equal to the second threshold, that determining the first sample is beyond the first threshold includes determining that the first sample is greater than the first threshold, and that determining the second sample is beyond the second threshold includes determining that the second sample is less than the second threshold. In this case, the first signal has a higher voltage level than the second signal.

In a second case, it is considered that the second threshold is greater than or equal to the first threshold, that determining the first sample is beyond the first threshold includes determining that the first sample is less than the first threshold, and that determining the second sample is beyond the second threshold includes determining that the second sample is greater than the second threshold. In this case, the second signal has a higher voltage level than the first signal.

The sixth aspect affords many advantages. One advantage is that the apparatus 38 modifies a charge stored by the capacitor 92 to attempt to maintain the amplifier 58 within a central portion of its available output voltage range, and within a central portion of the input range of the analog-to-digital converter 60.

In accordance with a seventh aspect of the present invention, the pre-charge processor 79 is operative to activate the emitter 54, to read a first sample from the analog-to-digital converter 60, to apply a first signal to the control input 90 for a first duration upon determining that the first sample is less than a first threshold, to read a second sample from the analog-to-digital converter 60, to determine that the second sample is greater than a second threshold, and to apply a second signal to the control input 90 for a second duration less than the first duration. Preferably, the first threshold is less than the second threshold, the first signal has a first voltage level which is generally constant, the second signal has a second voltage level which is generally constant, the first voltage level differs from the second voltage level, and the second duration is half of the first duration.

In accordance with an eighth aspect of the present invention, the pre-charge processor 79 is operative to activate the emitter 54, to read a first sample from the analog-to-digital converter 60, to apply a first signal to the control input 90 for a first duration upon determining that the first sample is greater than a first threshold, to read a second sample from the analog-to-digital converter 60, to determine that the second sample is less than a second threshold, and to apply a second signal to the control input 90 for a second duration less than the first duration. Preferably, the first threshold is greater than the second threshold, the first signal has a first voltage level which is generally constant, the second signal has a second voltage level which is generally constant, the first voltage level differs from the second voltage level, and the second duration is half of the first duration.

Figure 2:
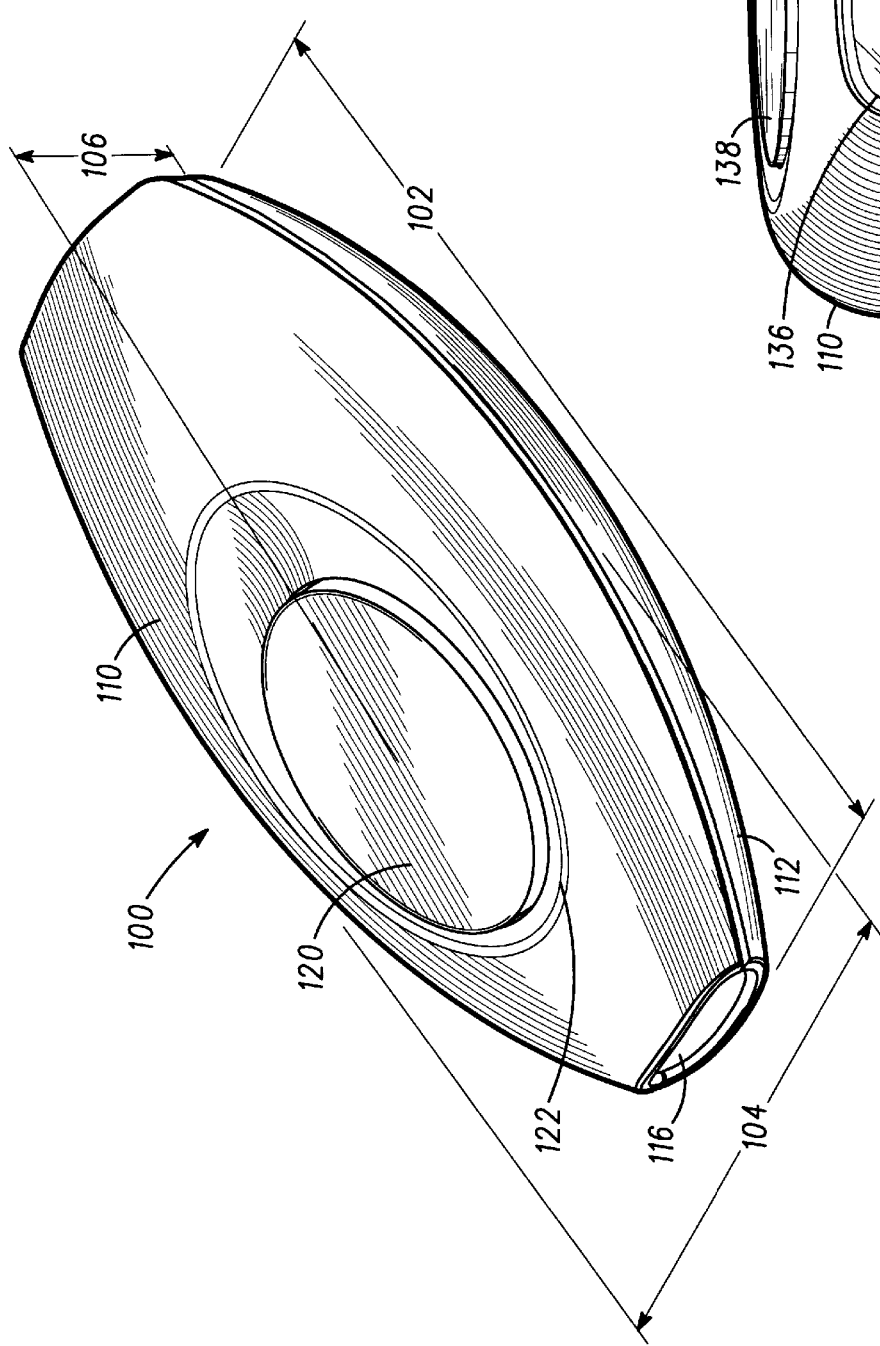
FIG. 2 is a top isometric view of a first embodiment of the apparatus.

FIG. 2 is a top isometric view of a first embodiment of the apparatus. The apparatus comprises a housing 100. The housing 100 defines a major dimension 102, an intermediate dimension 104 and a minor dimension 106 which are mutually orthogonal. The major dimension 102 is longer than both the intermediate dimension 104 and the minor dimension 106. The intermediate dimension 104 is longer than the minor dimension 106. In an exemplary version of the first embodiment, the major dimension 102 has a length of about 1.94 inches, the intermediate dimension 104 has a length of about 1.02 inches, and the minor dimension 106 has a length of about 0.475 inches. The housing 100 has a corner-less and generally ovular shape spanning the major dimension 102 and the intermediate dimension 104.

The size and shape of the housing 100 are amenable for grasping by an end user in a manner similar to grasping a writing implement such as a pen, a pencil, or a stylus. Alternatively, the housing 100 can be grasped in a manner similar to grasping a guitar pick. The size and shape of the housing 100 are also amenable for carrying by the end user in a pocket or a purse.

The housing 100 includes a first housing portion 110 and a second housing portion 112. The first housing portion 110 and the second housing portion 112 snap together in a clam shell manner to define opposite faces of the housing 100. Preferably, the first housing portion 110 and the second housing portion 112 are formed of plastic such as injection-molded ABS/PC. It is noted, however, that the housing 100 can be formed from alternative materials using alternative processes.

The housing 100 houses or otherwise supports an optical reader including an optical head 116. The optical reader is used to read the optical code 40 from the external device 42. The optical head 116 is also employed to communicate optical signals with external devices having an optical interface, such as the external device 44 having the optical interface 46.

The apparatus further comprises a member such as a button key top 120 to control the activation and deactivation of the optical reader. Preferably, the button key top 120 is inset within the housing 100. As illustrated, the button key top 120 can be inset within an opening 122 of the first housing portion 110. Preferably, the button key top 120 is formed of plastic such as injection-molded ABS/PC. It is noted, however, that the button key top 120 can be formed from alternative materials using alternative processes.

FIG. 3 is an end view of the first embodiment of the apparatus. As illustrated, the optical head 116 is disposed at an end 130 of the housing 100. The optical head 116 includes the emitter 54 and the detector 56 (neither specifically illustrated). The emitter 54 emits light either to illuminate the optical code 40 such as a bar code or to transmit optical data. Light from the emitter 54 is transmitted through an aperture 136.

The detector 56 detects light to receive optical data either illuminated by the emitter 54 or transmitted by an external device. The detector 56 detects light through the aperture 136 and through an aperture 138.

The apertures 136 and 138 are used for data communication with the optical interface 46 associated with the external device 44. The aperture 138 provides an improved optical communication path from the optical interface 46 to the detector 56. The aperture 136 is used to read the optical code 40.

The emitter 54 preferably includes an infrared light-emitting diode. The detector 56 preferably includes either an infrared phototransistor or photodiode.

The emitter 54 and the detector 56 are separated generally along either the intermediate dimension 104 or the minor dimension 106. If separated along the intermediate dimension 104, the emitter 54 and the detector 56 have a greater separation along the intermediate dimension 104 than for either the major dimension 102 or the minor dimension 106. If separated along the minor dimension 106, the emitter 54 and the detector 56 have a greater separation along the minor dimension 106 than for either the major dimension or the intermediate dimension 104.

Figure 4:
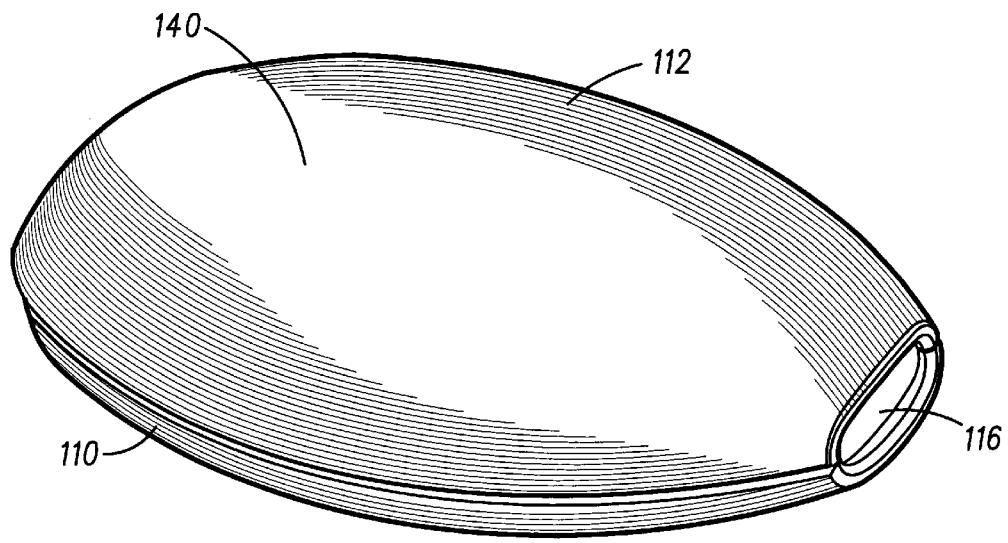
FIG. 4 is a bottom isometric view of the first embodiment of the apparatus.

FIG. 4 is a bottom isometric view of the first embodiment of the apparatus. As illustrated, the second housing portion 112 defines a back face 140 for grasping the apparatus. Typically, the end user grasps the apparatus by supporting the back face 140 with his/her index finger and supporting the first housing portion 110 and/or the button key top 120 with his/her thumb.

To read the optical code 40, the end user grasps the apparatus as previously described. While grasping the apparatus, the user depresses the button key top 120 to activate the optical reader. Thereafter, the user swipes the optical head 116 across the optical code 40, such as a bar code. After reading the optical code 40, the user can release the button key top 120. Alternatively, the user can release the button key top 120 prior to an entire portion of the optical code 40 having been read by the optical head 116. As described with reference to FIGS. 11 and 12, one or more circuits associated with the apparatus can remain active upon release of the button key top 120 so that the entire portion of the optical code 40 can be read.

Figure 5:
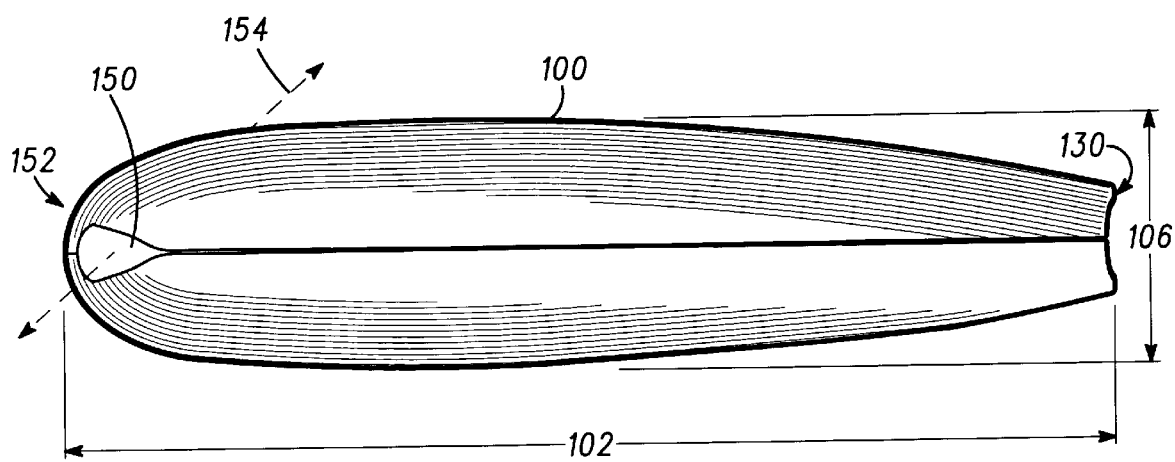
FIG. 5 is a side isometric view of the first embodiment of the apparatus.

FIG. 5 is a side isometric view of the first embodiment of the apparatus. The housing 100 defines an opening 150 at an end 152 opposite to the end 130. The opening 150 extends through the housing 100 along an axis 154 parallel or generally parallel to the intermediate dimension 104. By generally parallel, it is meant that the axis 154 is closer to parallel to the intermediate dimension 104 than to the major dimension 102 and the minor dimension 106.

The opening 150 is sized to receive a ring, a cord, a clip, or another thin member. Using the opening 150, the apparatus can be tethered to a location or to a person. For example, the apparatus can be tethered to a key ring as a key fob for carrying by the end user. In this case, either a split ring or a cable leash can loop through the opening 150 to provide a key chain attachment. Alternatively, the apparatus can be mounted to a necklace, a bracelet, an earring, a shirt, or another item worn by the end user. As another alternative, the apparatus can be tethered to a location of a computer.

Figure 6:
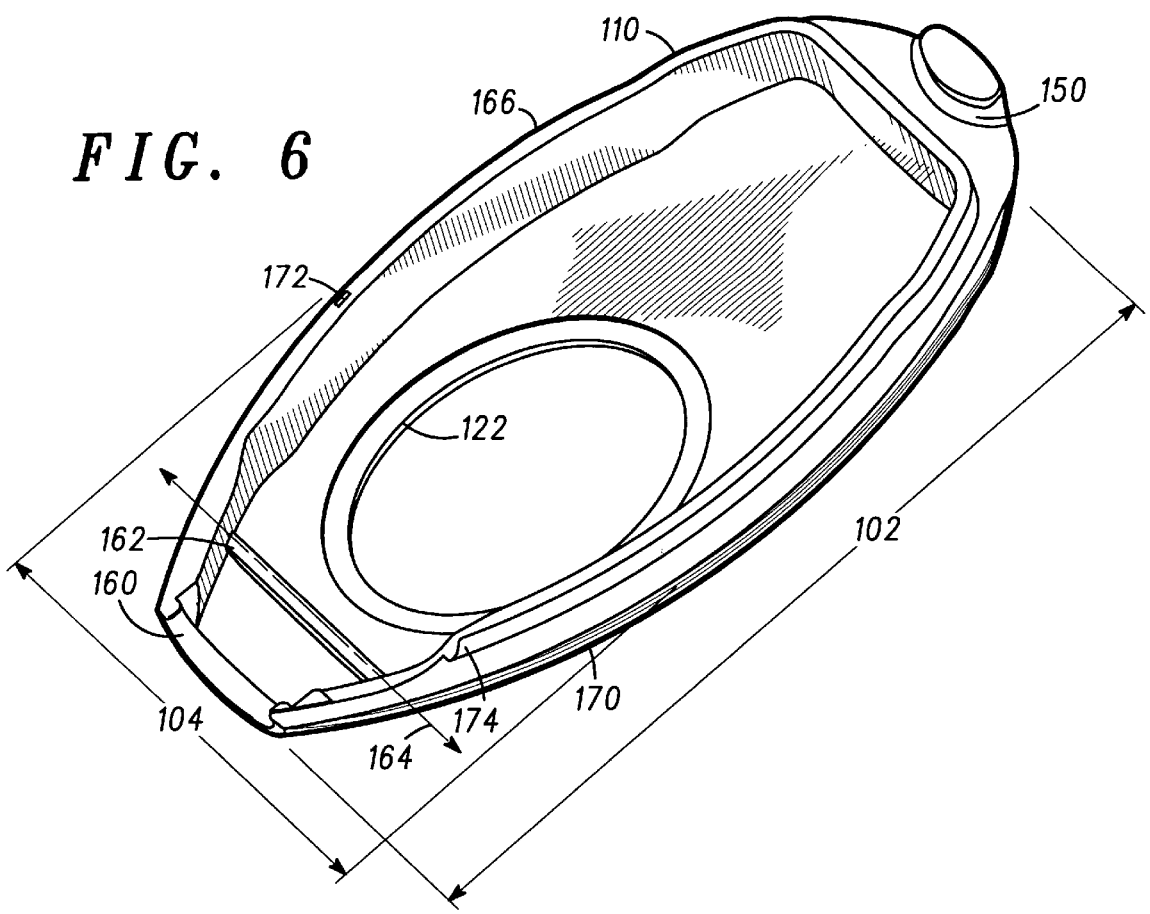
FIGS. 6 and 7 are isometric views of the first embodiment of the first housing portion.
Figure 7:
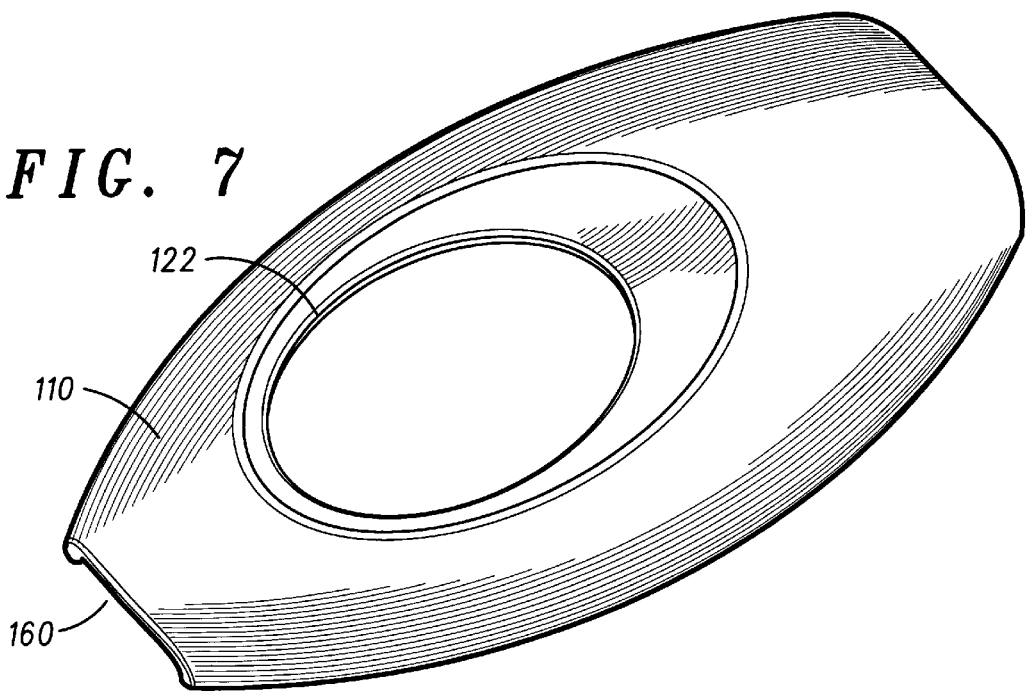

FIGS. 6 and 7 are isometric views of the first embodiment of the first housing portion 110. The first housing portion 110 defines an opening 160 to partially surround and support the optical head 116. The first housing portion 110 further defines an elongate support member 162 to assist in supporting the optical head 116 within the housing 100. The support member 162 is oriented along an axis 164 transverse to the major dimension 102. Preferably, the axis 164 is either parallel to or generally parallel to the intermediate dimension 104.

Ridges 166 and 170 are located at opposite sides of the first housing portion 110 with respect to the intermediate dimension 104. Tabs 172 and 174 are located at opposite sides of the first housing portion 110, near the ends of the ridges 166 and 170.

Figure 8:
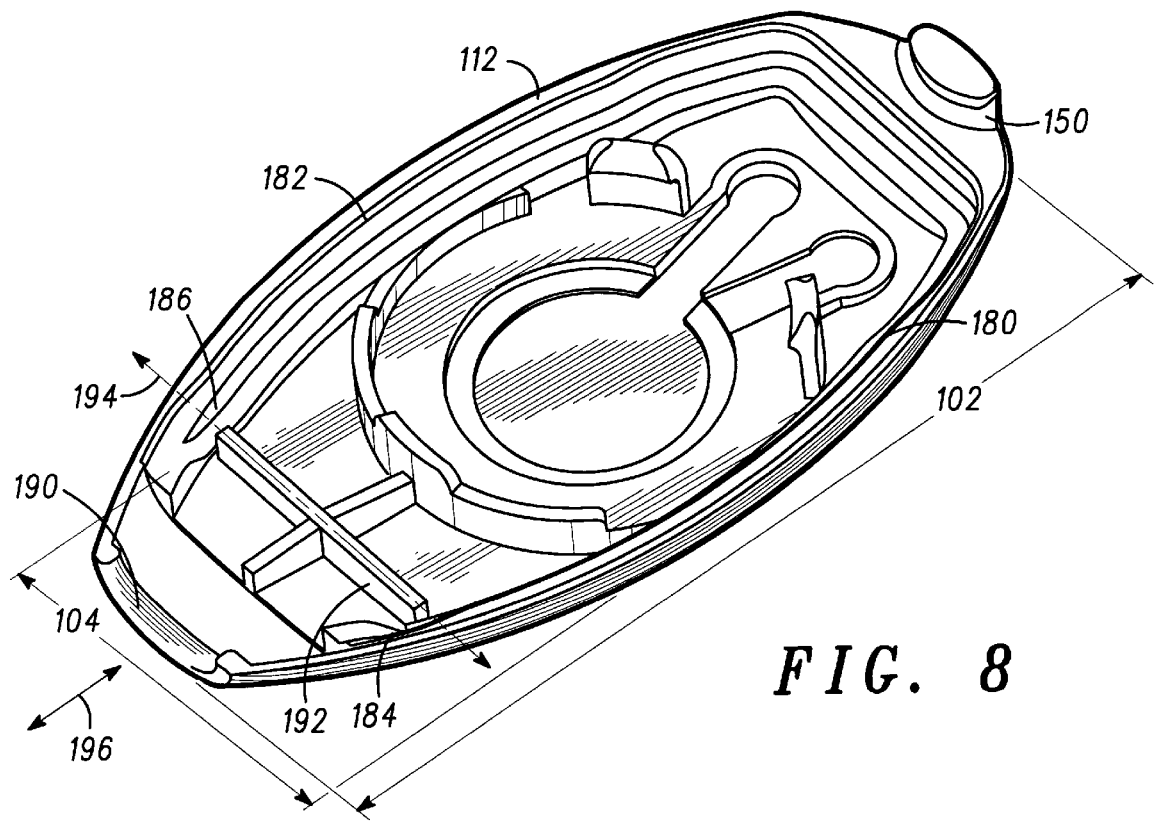
FIG. 8 is an isometric view of the first embodiment of the second housing portion.

FIG. 8 is an isometric view of the first embodiment of the second housing portion 112. The second housing portion 112 defines grooves 180 and 182 to mate with the ridges 166 and 170, respectively, of the first housing portion 110. The grooves 180 and 182 cooperate with the ridges 166 and 170 to align the first housing portion 110 with respect to the second housing portion 112.

The second housing portion 112 defines slots 184 and 186 to mate with the tabs 172 and 174, respectively, of the first housing portion 110. The slots 184 and 186 cooperate with the tabs 172 and 174 to snap lock the first housing portion 110 to the second housing portion 112.

The second housing portion 112 defines an opening 190 to partially surround and support the optical head 116. When the first housing portion 110 and the second housing portion 112 are coupled, the openings 160 and 190 combine to form an opening through which the optical head 116 is accessible. Further, the openings 160 and 190 encircle at least a majority portion of an end of the optical head 116. The openings 160 and 190 can further assist to retain the optical head 116 within the housing 110.

The second housing portion 112 further defines an elongate support member 192 to assist in supporting the optical head 116 within the housing 100. The support member 192 is oriented along an axis 194 transverse to the major dimension 102. Preferably, the axis 194 is either parallel to or generally parallel to the intermediate dimension 104. When the first housing portion 110 and the second housing portion 112 are coupled, the support members 162 and 192 maintain the position of the optical head 116 within the housing 110 with respect to an axis 196.

Figure 9:
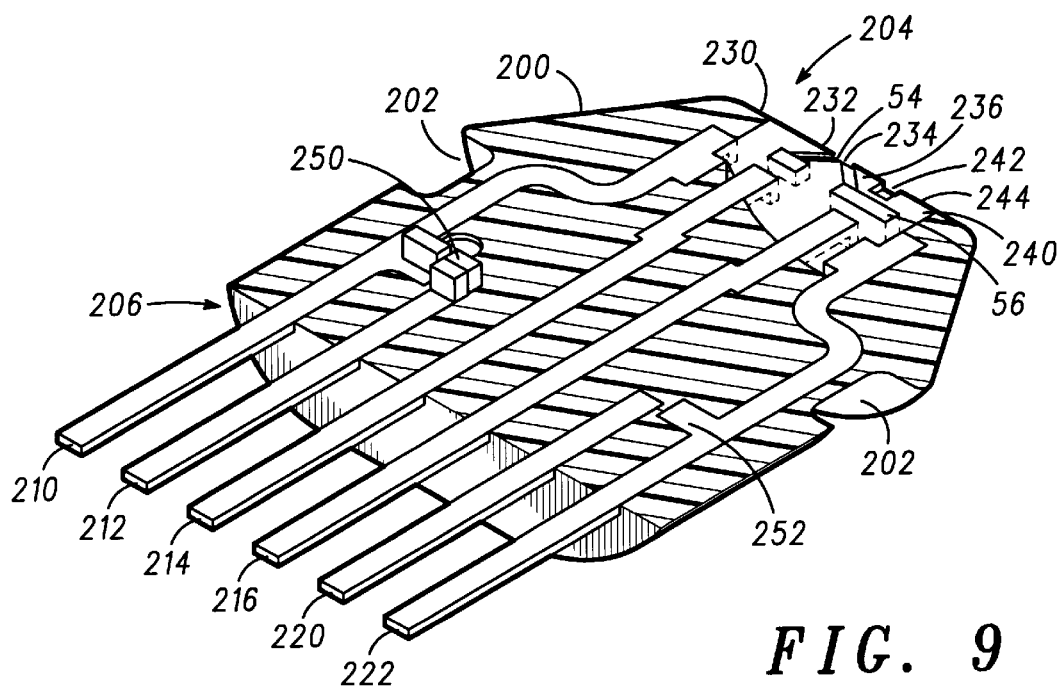
FIG. 9 is a cut-away view of a first embodiment of the optical head.

FIG. 9 is a cut-away view of a first embodiment of the optical head 116. The optical head 116 has a body 200. Preferably, the body 200 is formed of a transparent or translucent acrylic material for communicating optical signals therethrough. The body 200 defines at least one groove 202 to receive the support members 162 and 192. Preferably, the groove 202 encircles at least a majority of a portion of the body 200.

The body 200 has an oblong cross section to inhibit rotation of the optical head 116 within the housing 100. The body 200 generally increases in a cross sectional dimension from a reading end 204 to the groove 202. The body 200 has a generally constant cross sectional dimension from the groove 202 to an end 206 opposite the reading end 204.

The body 200 encapsulates wires 210, 212, 214, 216, 220 and 222. The wires 210, 212, 214, 216, 220 and 222 are oriented generally parallel to one another at a portion of the optical head 116 near the end 206.

The body 200 encapsulates a housing 230 for the emitter 54 and the detector 56. Preferably, the housing 230 is formed of a metallic material such as steel to shield the emitter 54 and the detector 56 from non-optical external radiation, and from optical radiation communicated within the body 200. The housing 230 includes a partition 232 interposed between the emitter 54 and the detector 56. The partition 232 shields the detector 56 from direct optical radiation emanating from the emitter 54.

The housing 230 includes a first aperture 234 at the reading end 204. Preferably, the first aperture 234 has an elliptical shape with a major diameter of about 0.009 inches, and a minor diameter of about 0.008 inches. The major axis of the first aperture 234 is substantially parallel to the minor dimension 106. The minor axis of the first aperture 234 is substantially parallel to the intermediate dimension 104.

The housing 230 defines a waveguide 236 to communicate optical signals (e.g. infrared light) from the emitter 54 to the first aperture 234. The housing 230 further defines a waveguide 240 to communicate optical signals (e.g. infrared light) from the first aperture 234 to the detector 56. Preferably, the waveguides 236 and 240 are generally cylindrical between the first aperture 234, and the emitter 54 and the detector 56, respectively. The waveguides 236 and 240 join at the first aperture 234 to form a V-shape.

The housing 230 further includes a second aperture 242 at the reading end 204. Preferably, the second aperture 242 has a circular shape with a diameter of about 0.008 inches. The housing 230 further defines a waveguide 244 to communicate optical signals (e.g. infrared light) from the second aperture 242 to the detector 56. Preferably, the waveguide 244 is generally cylindrical between the second aperture 242 and the detector 56. The waveguide 244 is transverse to both of the waveguides 236 and 240. Preferably, the waveguide 244 is oriented substantially parallel to the major dimension 102.

It is preferred that the waveguides 236, 240, and 244 be filled with a transparent material such as epoxy to keep the first aperture 234, the second aperture 242, and the waveguides 236, 240, and 244 free from foreign particles such as dust.

Preferably, the emitter 54 comprises an infrared light emitting diode die (half of which is illustrated in FIG. 9) having a first terminal and a second terminal. The wire 210 is coupled to the first terminal. The wire 214 is coupled to the second terminal.

Preferably, the detector 56 comprises an infrared phototransistor die (half of which is illustrated in FIG. 9) having a first terminal and a second terminal. The wire 216 is coupled to the first terminal. The wire 222 is coupled to the second terminal.

The body 200 further encapsulates a first indicator 250 and a second indicator 252 (which, although not specifically illustrated, is located below the cut-away surface). The first indicator 250 and the second indicator 252 provide the visual indicator 76 described with reference to FIG. 1. The first indicator 250 and the second indicator 252 provide externally-visible indications through the body 200.

Preferably, the first indicator 250 includes a first light emitting diode having a first terminal coupled to the wire 210 and a second terminal coupled to the wire 212. The second indicator 252 preferably includes a second light emitting diode having a first terminal coupled to the wire 220 and a second terminal coupled to the wire 222.

It is preferred that transfer encapsulation of wire-bonded leadframe technology be utilized to construct this embodiment of the optical head 116. By being absent of a lens, the first embodiment of the optical head 116 can be manufactured without the cost associated with the lens.

Figure 10:
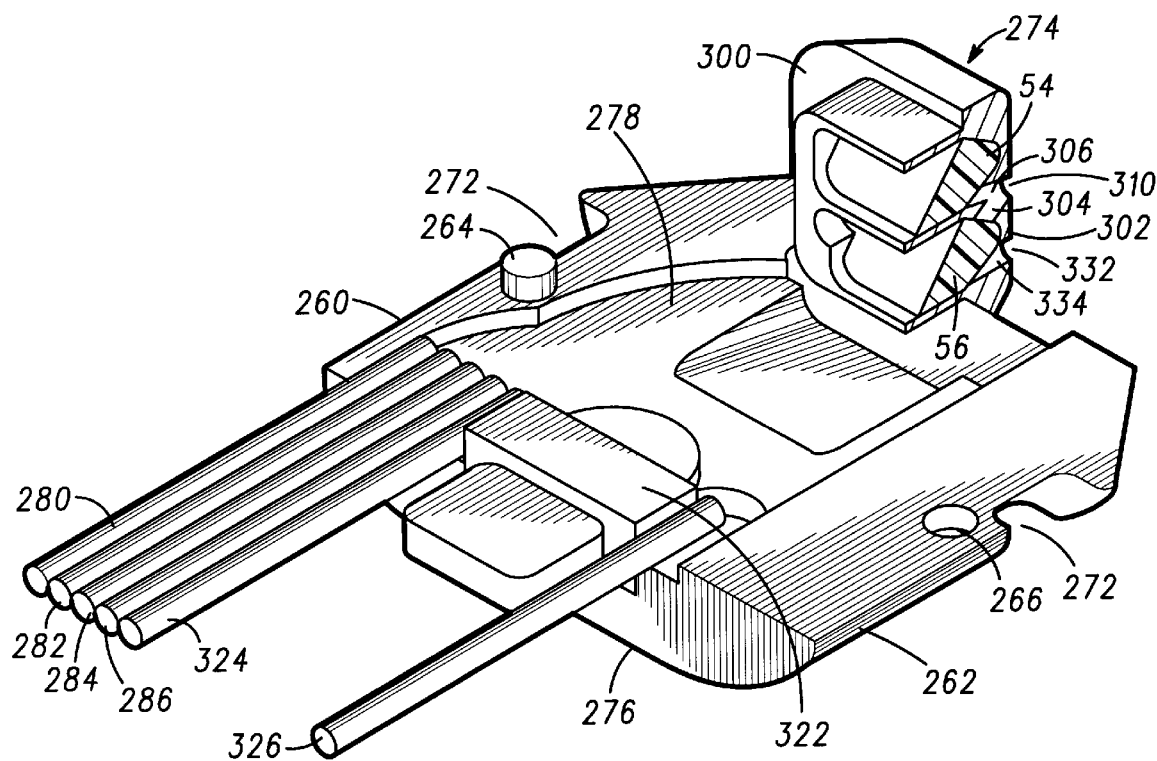
FIG. 10 is a cut-away view of a second embodiment of the optical head.

FIG. 10 is a cut-away view of a second embodiment of the optical head 116. This embodiment is constructed using surface mount technology (SMT) components.

The optical head 116 has a body 260 comprised of a first body portion 262 and a second body portion (not illustrated). The first body portion 262 includes a peg 264 and a hole 266 which mate with a hole and a peg (not illustrated), respectively, of the second body portion. Preferably, the body 260 is formed of a transparent or translucent acrylic material for communicating optical signals therethrough. It is also preferred that the body 260 be formed using an injection molding process.

The first body portion 262 defines a groove 272. Similarly, the second body portion (not illustrated) defines a groove (not illustrated).

The body 260 has an oblong cross section to inhibit rotation of the optical head 116 within the housing 100. The body 260 generally increases in a cross sectional dimension from a reading end 274 to the groove 272. The body 200 has a generally constant cross sectional dimension from the groove 272 to an end 276 opposite the reading end 274.

The body 260 defines a channel 278 to house and guide wires 280, 282, 284 and 286 from the end 276 toward the reading end 274. The wires 280, 282, 284 and 286 are oriented generally parallel to one another through the channel 278.

At the reading end 274, the body 260 receives a housing 300 for the emitter 54 and the detector 56. Preferably, the housing 300 is formed of a metallic material such as aluminum to shield the emitter 54 and the detector 56 from non-optical external radiation. The housing 300 includes a partition 302 interposed between the emitter 54 and the detector 56. The partition 302 shields the detector 56 from direct optical radiation emanating from the emitter 54.

The housing 300 includes a first aperture 304 at the reading end 274. The first aperture 304 has an elliptical shape with a major diameter of about 0.009 inches, and a minor diameter of about 0.008 inches. The major axis of the first aperture 304 is substantially parallel to the minor dimension 106. The minor axis of the first aperture 304 is substantially parallel to the intermediate dimension 104. Alternatively, the first aperture 304 can have a circular shape with a diameter of about 0.008 inches.

The housing 300 defines a waveguide 306 to communicate optical signals (e.g. infrared light) from the emitter 54 to the first aperture 304. The housing 300 further defines a waveguide 310 to communicate optical signals (e.g. infrared light) from the first aperture 304 to the detector 56. Preferably, the waveguides 306 and 310 are generally cylindrical between the first aperture 304, and between the emitter 54 and the detector 56, respectively. The waveguides 306 and 310 join at the first aperture 304 to form a V-shape. It is preferred that the waveguides 306 and 310 be filled with an infrared-transparent material such as epoxy to keep the first aperture 304 and the waveguides 306 and 310 free from foreign particles such as dust.

Preferably, the emitter 54 comprises an infrared light emitting diode SMT (half of which is illustrated in FIG. 10) having a first terminal and a second terminal. The wire 280 is coupled to the first terminal. The wire 282 is coupled to the second terminal.

Preferably, the detector 56 comprises an infrared phototransistor SMT (half of which is illustrated in FIG. 10) having a first terminal and a second terminal. The wire 284 is coupled to the first terminal. The wire 286 is coupled to the second terminal.

The body 260 includes a cavity 312 at an end of the channel 278 proximate to the emitter 54 and the detector 56. The cavity 312 is sized so that the wires 280, 282, 284 and 286 can be connected to the emitter 54 and the detector 56.

Although not illustrated as such, the wires 280, 282, 284 and 286 extend through the channel 278 and the cavity 312. The aforementioned portions of the wires 280, 282, 284 and 286 are omitted from FIG. 10 to better illustrate the channel 278 and the cavity 312.

The body 260 further defines a region 320 to receive and to at least partially surround an indicator 322. Preferably, the indicator 322 includes a light emitting diode having a first terminal coupled to a wire 324 and a second terminal coupled to a wire 326. The indicator 322 provides the visual indicator 76 described with reference to FIG. 1. The indicator 322 provides externally-visible indications through the body 260.

The housing 300 further includes a second aperture 332 at the reading end 274. Preferably, the second aperture 332 has a circular shape with a diameter of about 0.008 inches. The housing 300 further defines a waveguide 334 to communicate optical signals (e.g. infrared light) from the second aperture 332 to the detector 56. Preferably, the waveguide 334 is generally cylindrical between the second aperture 332 and the detector 56. The waveguide 334 is transverse to both of the waveguides 306 and 310. Preferably, the waveguide 334 is oriented substantially parallel to the major dimension 102.

By being absent of a lens, the second embodiment of the optical head 116 can be manufactured without a cost associated with the lens.

Figure 11:
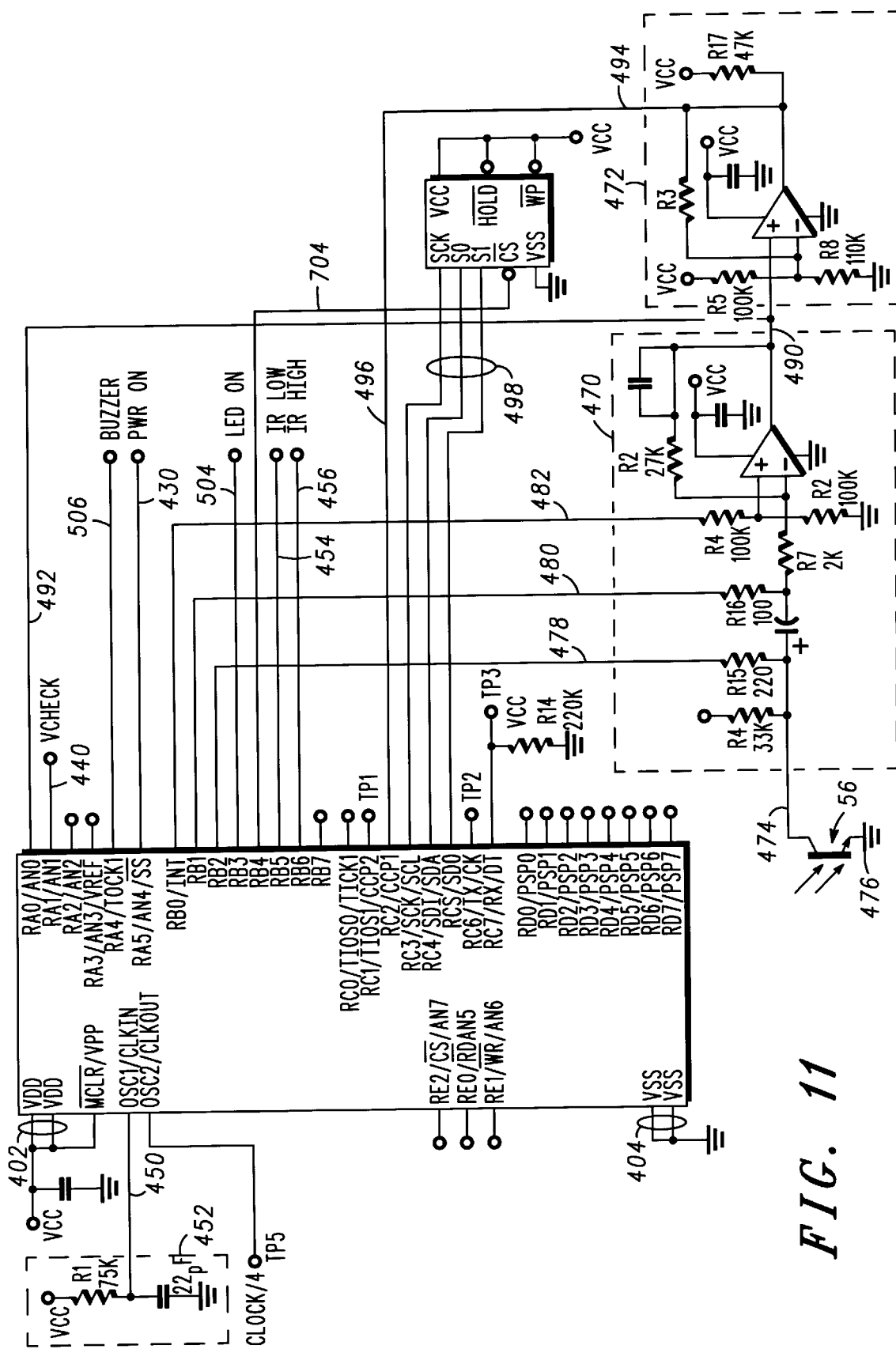
FIGS. 11 and 12 are schematic diagrams of an embodiment of an optical reader circuit.
Figure 12:
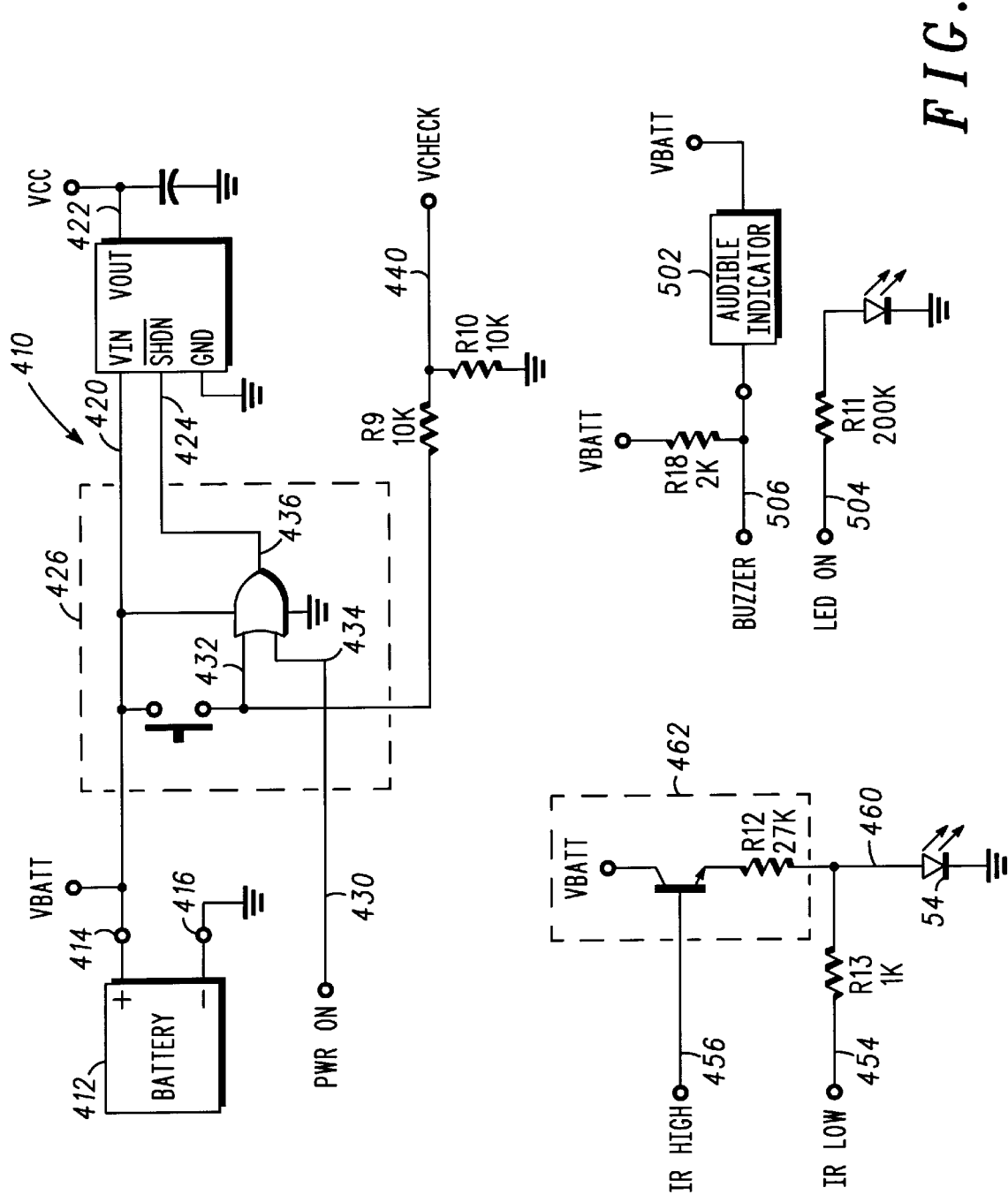

FIGS. 11 and 12 are schematic diagrams of an embodiment of a circuit associated with the apparatus. The circuit is housed or otherwise supported by the housing 100.

A microcontroller U1 having a central processor unit (CPU) and a program memory directs the operation of the circuit. The CPU is directed in dependence upon machine-readable data stored by the program memory. Preferably, the machine-readable data include program code to direct the microcontroller U1 to provide the optical code reader circuit 50, the data communication circuit 52, the message generator 64, the decoder 66, and the memory manager 68 described with reference to FIG. 1.

In general, the program memory can include any machine-readable storage medium to store the machine-readable data. In a preferred embodiment, the program memory includes an electrically programmable read-only memory (EPROM). It is noted, however, that the machine-readable storage medium can alternatively include an optical storage medium having optical data or a magnetic storage medium having magnetic data.

In a preferred embodiment, the microcontroller U1 includes a microcontroller having part number PIC16LC74A from Microchip Technology Inc. In this case, the microcontroller U1 has the multi-bit analog-to-digital converter 60 integrated therewith. In particular, the multi-bit analog-to-digital converter 60 includes an 8-bit analog-to-digital converter in this case. It is noted, however, that use of various alternative microcontrollers and microprocessors are within the scope of the present invention.

The microcontroller U1 has positive supply inputs 402 connected to a supply line VCC, and ground reference inputs 404 connected to a ground line. A capacitor C1 stabilizes the voltage applied to the positive supply inputs 402.

A power supply circuit 410 provides power to the supply line VCC based upon a battery source 412. Preferably, the battery source 412 includes a series combination of two 3-volt, lithium coin cells, such as those having part number CR2016 available from Panasonic.

The power supply circuit 410 includes a first terminal 414 to connect to a first terminal of the battery source 412 and a second terminal 416 to connect to a second terminal of the battery source 412. The first terminal 414 is connected to a supply line VBATT. The second terminal 416 is connected to the ground line.

The supply line VBATT is connected to an input 420 of a voltage regulator U5. The voltage regulator U5 provides a regulated voltage at an output 422 connected to the supply line VCC. A capacitor C6 is applied between the output 422 and ground to further stabilize the voltage level provided to the supply line VCC. In a preferred embodiment, the voltage regulator U5 includes a voltage regulator integrated circuit having part number LP2980AIM5-3.3 to provide a regulated voltage at the output 422.

The voltage regulator U5 further includes a control input 424 to selectively inhibit the regulated voltage from being provided to the output 422. The control input 424 is responsive to control logic 426 comprised of an OR gate U6 and a switch S1, and an output 430 from the microcontroller U1. The OR gate U6 preferably includes an OR gate integrated circuit having part number TC7SL32FU available from Toshiba, although other alternatives are within the scope of the present invention.

The OR gate U6 includes a first input 432 and a second input 434. The switch S1 is connected between the first input 432 and the supply line VBATT. A series combination of the resistors R9 and R10 are connected between the first input 432 and the ground line. The second input 434 is connected to the output 430. The OR gate U6 is powered by the supply line VBATT.

It is noted that an alternative microcontroller capable of being directly powered by the battery source 412 can be selected. In this case, the resulting circuit is absent of the regulator U5 and the OR gate U6.

The switch S1 is mounted within the housing 100 to be responsive to user-initiated actions of the button key top 120 described herein. In response to a user-initiated depression of the switch S1, the voltage of the supply line VBATT is applied to the first input 432. In this case, an output 436 of the OR gate U6 provides a high logical level to the control input 424 regardless of the state of the output 430. As a result, the voltage regulator U5 is activated to provide a supply voltage to the supply line VCC.

If the switch S1 is undepressed, the supply line VBATT is uncoupled from the first input 432, and hence the first input 432 is only coupled to the ground line. In this case, the output 436 of the OR gate U6 is dependent upon the state of the output 430. If the output 430 is at a high logical level, then the output 436 provides a high logical level to the control input 424, and the voltage regulator U5 remains activated. If the switch S1 is undepressed and the output 430 is at a low logical level, the output 436 provides a low logical level to the control input 424 to deactivate the voltage regulator U5.

It is noted that a dual Schottky diode can be substituted for the OR gate U6 to provide the aforementioned logic.

The microcontroller U1 has an input 440 to sense a condition of the battery source 412. The input 440 is connected to a node at which a resistor R9 is connected to a resistor R10. If the switch S1 is depressed, the input 440 receives a non-zero voltage level based upon the voltage level of the battery source 412 (considering that the battery source 412 is undepleted). If the switch S1 is undepressed, the input 440 is coupled to the ground line. If desired, the microcontroller U1 can detect if a voltage level at the input 440 is less than a predetermined voltage threshold. If the voltage level at the input 440 is less than the predetermined voltage level, the microcontroller U1 can disable an optical code reading feature but can continue to enable data communication features.

Via the output 430, the microcontroller U1 maintains the activation of the voltage regulator U5 for a duration after the switch S1 has been released. In particular, the microcontroller U1 provides a high logical level at the output 430 for a time duration after sensing the release of the switch S1 from the input 440. Thereafter, the microcontroller U1 provides a low logical level at the output 430 to deactivate the voltage regulator U5.

The microcontroller U1 further includes a clock source input 450 connected to a subcircuit 452. The subcircuit 452 includes a resistor R1 coupling the supply line VCC to the clock source input 450, and a capacitor C2 coupling the clock source input 450 to ground. The values of the resistor R1 and the capacitor C2 are selected to provide a clock signal having a suitable frequency for the microcontroller U1. In a preferred embodiment, the values of the resistor R1 and the capacitor C2 are selected to provide a clock frequency of about 3.6864 MHz. With this clock frequency, a resulting execution time for a single instruction is about 1.085 $\mu$sec. It is noted that, alternatively, the subcircuit 452 can include a crystal which dictates the clock frequency.

The emitter 54 is responsive to outputs 454 and 456 of the microcontroller U1. The output 454 is coupled to an anode 460 of the emitter 54 via a resistor R13. The output 456 is coupled to the anode 460 via a buffer 462. The buffer 462 includes a transistor Q2 having a base connected to the output 456, a collector connected to the supply line VBATT, and an emitter connected to the anode 460 by a resistor R12.

The buffer 462 provides a greater current to the emitter 54 than from directly from the microcontroller U1. As a result, the microcontroller U1 can command a greater illumination of the emitter 54 using the output 456 than using the output 454. As subsequently described in detail, the emitter 54 is driven by the output 454 to produce a lower intensity for optical code reading purposes, and is sequentially driven by the outputs 454 and 456 to produce a higher intensity for data communication purposes.

The detector 56 is coupled to the microcontroller U1 by an amplifier 470 and a comparator 472. The detector 56 includes a first terminal 474 coupled to the supply line VCC by a resistor R6, and a second terminal 476 coupled to the ground line. The first terminal 474 is also coupled to an output 478 of the microcontroller U1 by a resistor R15. Using the output 478, the microcontroller U1 can varying the gain of the amplifier 470, i.e. can vary the amplification of signals produced at the first terminal 474.

The amplifier 470 comprises an operational amplifier U3, resistors R2, RC2, R4, R7, and R16, and capacitors RC1, C3, and C4. The operational amplifier U3 is powered by the supply line VCC. The capacitor C4 stabilizes the supply voltage presented to the operational amplifier U3. Preferably, the operational amplifier U3 includes an operational amplifier integrated circuit having part number TLV2231CDBV from Texas Instruments, although alternative operational amplifiers are within the scope of the present invention.

The resistors R2 and R7 are interconnected with the operational amplifier U3 in an inverting amplifier configuration. The capacitor C3 is an optional component connected between the inverting input and the output of the operational amplifier U3 to reduce the gain for higher frequency components. It is noted that in a preferred embodiment, the capacitor C3 is omitted from the amplifier 470.

The inverting input of the operational amplifier U3 is responsive to an output 480 of the microcontroller U1 via the resistor R16. Using the output 480, the microcontroller U1 applies precharge signals to compensate for a DC charge across the capacitor RC1.

The capacitor RC1 couples the first terminal 474 of the detector 56 to the inverting amplifier. The capacitor RC1 filters a DC component of signals generated at the first terminal 474 of the detector 56. It is noted that, optionally, a resistive component can be included with the capacitor RC1.

A voltage divider comprised of the resistors R4 and RC2 biases a non-inverting input of the operational amplifier U3. The voltage divider divides a voltage provided by an output 482 of the microcontroller U1 for application to the non-inverting input. Preferably, the voltage divider provides a voltage level of about half of VCC to the non-inverting input. It is noted that the resistor R4 can be directly coupled to the supply line VCC rather than through an output of the microcontroller U1. It is also noted that, optionally, the resistor RC2 can further include a capacitive component.

The comparator 472 comprises an comparator U4, resistors R3, R5, R8, and R17, and capacitor C5. The comparator U4 is powered by the supply line VCC. The capacitor C5 stabilizes the supply voltage presented to the comparator U4. Preferably, the comparator U4 includes an integrated comparator having part number TLV1391CDBV from Texas Instruments, although alternative comparators are within the scope of the present invention.

The resistor R5 couples the non-inverting input of the comparator U4 to the supply line VCC. The resistor R8 couples the non-inverting input of the comparator U4 to the ground line. The resistor R5 and the resistor R8 provide a voltage divider to divide the voltage level of VCC for application to the non-inverting input of the comparator U4.

Optionally, the resistor R3 couples the non-inverting input to the output of the comparator U4. It is noted that preferably the resistor R3 is omitted from the comparator 472. The inverting input of the comparator U4 is connected to an output 490 of the amplifier 470. The resistor R17 couples the output of the comparator U4 to the supply line VCC.

The output 490 of the amplifier 470 is coupled to an analog input 492 of the microcontroller U1. The analog input 492 provides an input to the analog-to-digital converter 60 integrated with the microcontroller U1. An output 494 of the comparator 472 is coupled to an input 496 of the microcontroller U1. The input 496 provides a digital input to the microcontroller U1.

In accordance with program code associated with the optical code reader circuit, the microcontroller U1 drives the emitter 54 to illuminate a portion of the optical code 40 such as a bar code. The microcontroller U1 directs the analog-to-digital converter 60 to sample amplified signals from the detector 56 at a rate of about 7700 samples per second, and hence, with a period of about 130 microseconds. The analog-to-digital converter 60 converts each analog signal sample to an 8-bit digital sample value. In this way, the microcontroller U1 reads data associated with at least the portion of the bar code sensed by the detector 56.

The microcontroller U1 performs an edge detection process to detect bars and spaces in the bar code. The edge detection process identifies edges from signals sensed via the input 492 from the detector 56. Preferably, edges are identified based upon a difference between consecutive averages of values sampled from the input 492. In this case, a first average can be equal to (S0+S1)/2 and a second average can be equal to (S1+S2)/2, where S0 represents a first value sampled during a first sampling interval, S1 represents a second value sampled during a second sampling interval immediately prior to the first sampling interval, and S2 represents a third value sampled during a third sampling interval immediately prior to the second sampling interval. The difference between the first average and the second average is (S0+S1)/2−(S1+S2)/2, which simplifies to (S0−S2)/2.

A dark-to-light edge transition is identified by detecting when the difference exhibits a local maximum and is greater than or equal to a first threshold. A light-to-dark edge transition is identified by detecting when the difference exhibits a local minimum and is less than or equal to a second threshold. Preferably, the first threshold is equal to 2 and the second threshold is equal to −2 to provide a noise margin.

An associated number of sample counts between each pair of adjacent edges is recorded. In this way, a set of associated numbers of sample counts is recorded to represent each bar width and each space width. Preferably, each associated number is stored as a value in the range of 1 to 253.

After reading the bar code and performing the edge detection, the microcontroller U1 decodes data encoded by the bar code. The microcontroller U1 decodes the data based upon the set of sample counts (i.e. the width data). The decoded data has the form of a binary number.

In general, the microcontroller U1 can store either the encoded data or the decoded data in a memory U2. Preferably, decoded data is stored in the memory U2.

The microcontroller U1 stores data to and reads data from the memory U2 via a serial peripheral interface (SPI) bus 498. Preferably, the memory U2 includes a nonvolatile memory device such as an EEPROM to maintain the data in the absence of a powering signal from the supply line VCC. In an exemplary embodiment, the memory U2 includes a serial EEPROM integrated circuit having part number 25AA160/SN available from Microchip.

In accordance with program code associated with the data communication circuit, the microcontroller U1 drives the emitter 54 to transmit data stored in the memory U2. Preferably, the data is transmitted with a protocol compliant with an IrDA data communication protocol such as the 9600 baud IrDA protocol.

The microcontroller U1 creates one or more packets to transmit the data via the emitter 54. Preferably, each packet is formatted to include a packet length portion, a packet data portion, and a packet checksum portion. The packet length portion includes one binary byte to indicate a total number of bytes in the packet (including the packet length, the packet data, and the packet checksum). The packet checksum portion includes one binary byte calculated as 0—sum of all packet lengths and packet data bytes.

The packet data portion is formatted to include a header portion, a main body portion, and a supplemental body portion. Preferably, the packet data portion includes one or more bytes corresponding to ASCII characters.

The header portion includes a first byte, a second byte, and a third byte. The first byte identifies the format of the bar code as originally scanned. The first byte includes either: (i) a first code, such as an ASCII code for "A", to identify a first bar code format such as UPC-A; (ii) a second code, such as an ASCII code for "E", to identify a second bar code format such as UPC-E; (iii) a third code, such as an ASCII code for "3", to identify a third bar code format such as EAN-13; or (iv) a fourth code, such as an ASCII code for "8", to identify a fourth bar code format such as EAN-8. It is noted that other bar code formats can be identified with corresponding codes within the first byte.

The second byte indicates a number of reported data bytes in the main body portion. Preferably, the second byte is set to an ASCII "0" plus the number of reported data bytes in the main body portion. In this case, for example, the second byte includes an ASCII code corresponding to the "=" character if the number of reported data bytes in the main body portion is 13. In general, the second byte indicates a length of the main body portion.

The third byte indicates a number of reported data bytes in the supplemental body portion. Preferably, the third byte is set to an ASCII "0" plus the number of reported data bytes in the supplemental body portion. In general, the third byte indicates a length of the supplemental body portion.

The main body portion includes a plurality of ASCII bytes from a scanned bar code. All UPC/EAN codes are reported in the form of an EAN code. In this case, a UPC code is prefixed by a first flag character of "0". More particularly, the main body portion includes either: (i) a first flag character, a second flag character, ten data digits, and a checksum digit for an EAN-13 code; (ii) a first flag character, a second flag character, five data digits, and a checksum digit for an EAN-8 code; (iii) a "0" character, a number system character, ten data digits, and a checksum digit for a UPC-A code; or (iv) a "0" character, a number system character, ten data digits, and a checksum digit for a UPC-E code. Bar codes originally scanned in the UPC-E format are reported using its equivalent in the UPC-A format. Alternatively, bar codes scanned in the UPC-E format can be reported in a UPC-E format.

The supplemental body portion is optionally included if the scanned bar code includes a supplemental bar code. For example, an ISBN code associated with books often includes a supplemental bar code in addition to an EAN code. The supplemental body portion includes a plurality of characters from the supplemental bar code. If the scanned bar code is unrecognized, the supplemental body portion is unreported.

Additionally in accordance with program code associated with the data communication circuit, the microcontroller U1 decodes data received by the detector 56. Preferably, the data is decoded in accordance with an IrDA protocol. The microcontroller U1 can store the data in the memory U2. The data can include data read from a like apparatus, or a routine executable by the microcontroller U1 to provide additional functionality.

The microcontroller U1 is responsive to the switch S1 or an alternative sensor to activate and deactivate the optical code reading and data communication features. The switch S1 senses a user-initiated depression and release of the button key top 120 described herein.

One or more indicators, such as a light-emitting diode D2 and/or an audible indicator 502, are responsive to the microcontroller U1 to indicate the status of the circuit. In particular, the light-emitting diode D2 is coupled to an output 504 of the microcontroller U1 by a resistor R11. The audible indicator 502 can include a speaker or a buzzer coupled to an output 506 of the microcontroller U1. A resistor R18 is connected between the audible indicator 502 and the supply line VBATT so that the audible indicator 502 is normally off.

The audible indicator 78 described with reference to FIG. 1 can include the audible indicator 502. The visual indicator 76 described with reference to FIG. 1 can include the light-emitting diode D2.

TABLE I lists specific descriptions, part numbers, and vendors for components in a preferred embodiment of the apparatus. It is noted that alternative components are also within the scope of the present invention.

TABLE I

| Components | Description | Vendor | Part Number |
|---|---|---|---|
| U1 | 44 pin, low power PIC with A/D | Microchip | PIC16LC74A-04/PC |
| U2 | SPI 16 kbit nonvolatile memory SO8 | Microchip | 25AA160/SN |
| U3 | CMOS SOT-23 | Texas Instruments | TLV2231CDBV |
| U4 | CMOS SOT-23 | Texas Instruments | TLV1391CDBV |

TABLE I-continued

| Components | Description | Vendor | Part Number |
|---|---|---|---|
| U5 | 3.3 V regulator | National | LP-2980AIM5-3.3 |
| U6 | Single 1 Volt OR gate | Toshiba | TC7SL32FU |
| Q1 | Optoelectronic sensor for scanner/IR port | Stanley | PS1101W |
| Q2 | NPN-SOT 323 | Rhom | UMT2222A |
| D1 | Emitter for scanner/IR port | Stanley | DN1102W |
| D2 | Red surface mount visible LED | Stanley | BR1101F |
| S1 | Light touch switch SMD, 5 mm | Panasonic | EVQ-PLMA15 |
| Audible Indicator 502 | Piezo transducer disk, 15 mm | China | |
| C1 | 0.1 µF ceramic | Rhom | MCH215F104ZP |
| C2 | 22 pF | Panasonic | ECU-V1H220VCV |
| C3 | Optional | | |
| C4, C5 | 0.01 µF ceramic | Panasonic | ECU-V1H103KBV |
| RC1 | 10 µF, 6.3 V Tantalum electrolytic | Panasonic | ECS-TOJY106R |
| R1 | 7.5 k ohm | Panasonic | ERJ-3GSYS752V |
| R2 | 27 k ohm | Panasonic | ERJ-3GYSYJ273V |
| R3 | Optional | | |
| R4, R5, RC2 | 100 k ohm, 1/16 watt, 5%, 0603 | Panasonic | ERJ-3GSYJ104 |
| R6 | 3.3 k ohm | Panasonic | ERJ-3GSYJ332 |
| R7, R18 | 2 k ohm, 1/16 watt, 5%, 0603 | Panasonic | ERJ-3GSYJ202 |
| R8 | 110 k ohm | Panasonic | ERJ-3GSY114V |
| R9, R10 | 10 k ohm, 1/16 watt, 5%, 0603 | Panasonic | ERJ-3GSYJ103 |
| R11 | 200 ohm, 1/16 watt, 5%, 0603 | Panasonic | ERJ-6GEYJ201 |
| R12 | 27 ohm, 1/16 watt, 5%, 0603 | Panasonic | ERJ-3GSYJ270 |
| R13 | 1 k ohm, 1/16 watt, 5%, 0603 | Panasonic | ERJ-3GEYJ474 |
| R14 | 220 k ohm, 1/16 watt, 5%, 0603 | Panasonic | ERJ-3GSYJ224 |
| R15 | 220 ohm | Panasonic | ERJ-3GSYJ221 |
| R16 | 100 ohm | Panasonic | ERJ-3GSYJ101 |
| R17 | 47 k ohm | Panasonic | ERJ-3GSYJ472 |
| Battery 412 | 2 Lithium coin cells, 3 V, 90 mAH | Panasonic | CR2016 |

Components of the aforementioned circuit are mounted to a double-sided circuit board in a preferred embodiment. A layout for a preferred embodiment of the double-sided circuit board is described with reference to FIGS. 13 to 18.

Figure 13:
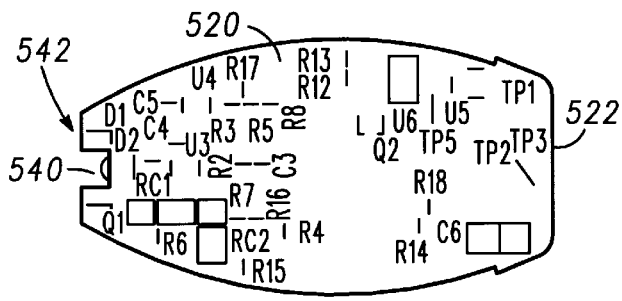
FIG. 13 is a view of a silkscreen layout on a first side of a circuit board.

FIG. 13 is a view of a silkscreen layout on a first side 520 of a circuit board 522. The first side 520 receives and supports the light-emitting diodes D1 and D2, the transistors Q1 and Q2, the resistors RC2, R2, R3, R4, R5, R6, R7, R8, R12, R13, R14, R15, R16, R17 and R18, the capacitors RC1, C3, C4, C5, and C6, the operational amplifier U3, the comparator U4, the voltage regulator U5, and the OR gate U6.

Figure 14:
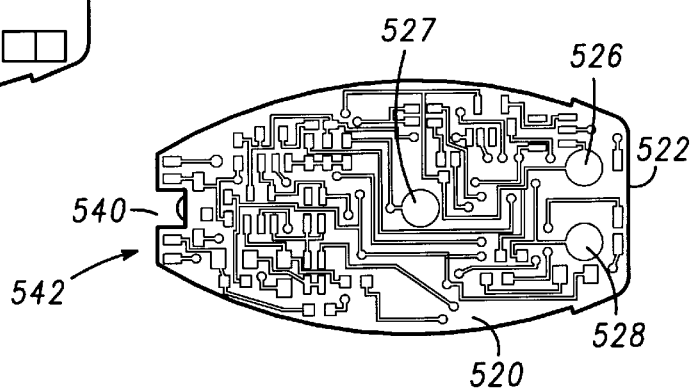
FIG. 14 is a view of the signal layout on the first side of the circuit board.
Figure 15:
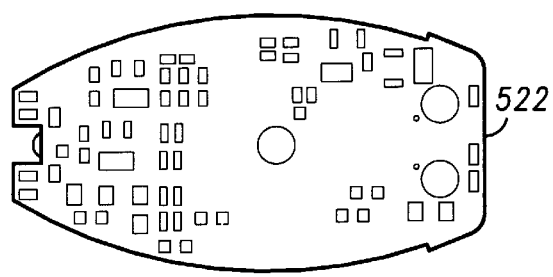
FIG. 15 is a solder mask layout for interconnecting the components mounted to the first side of the circuit board.

FIG. 14 is a view of the signal layout on the first side 520 of the circuit board 522. Disposed at the first side 520 are contact pads 526, 527, and 528. The contact pad 526 corresponds to a terminal J1 in FIG. 12. The contact pad 527 corresponds to a terminal J2 in FIG. 12. The contact pad 528 corresponds to a terminal J3 in FIG. 12. FIG. 15 is a solder mask layout for interconnecting the components mounted to the first side 520 of the circuit board 522.

Figure 16:
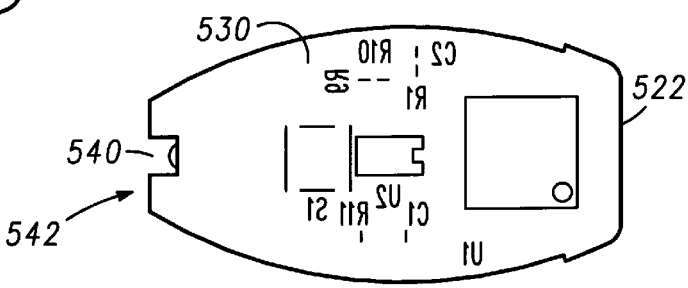
FIG. 16 is a view of a silkscreen layout on a second side of the circuit board.

FIG. 16 is a view of a silkscreen layout on a second side 530 of the circuit board 522. The second side 530 receives and supports the resistors R1, R9, R10, and R11, the capacitors C1 and C2, the microcontroller U1, the memory U2, and the switch S1.

Figure 17:
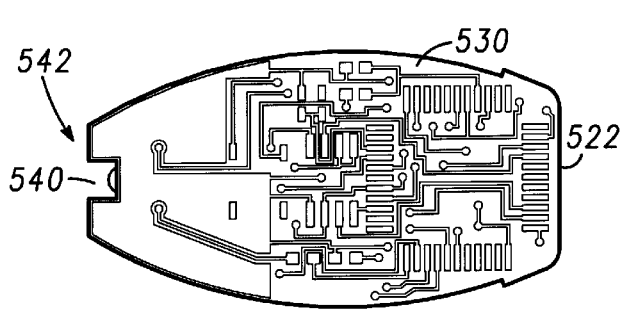
FIG. 17 is a view of the signal layout on the second side of the circuit board.
Figure 18:
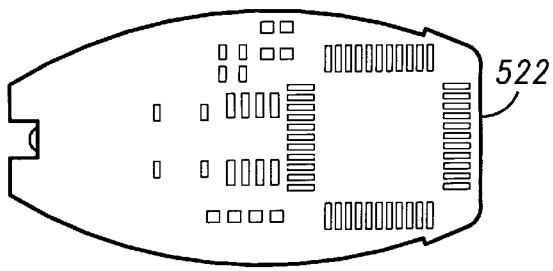
FIG. 18 is a solder mask layout for interconnecting the components mounted to the second side of the circuit board.

FIG. 17 is a view of the signal layout on the second side 530 of the circuit board 522. FIG. 18 is a solder mask layout for interconnecting the components mounted to the second side 530 of the circuit board 522.

Preferably, the circuit board 522 has a length of about 1.458 inches and a width of about 0.782 inches. The circuit board 522 has a notch 540 at a first end 542 to receive at least a portion of the optical head.

Figure 19:
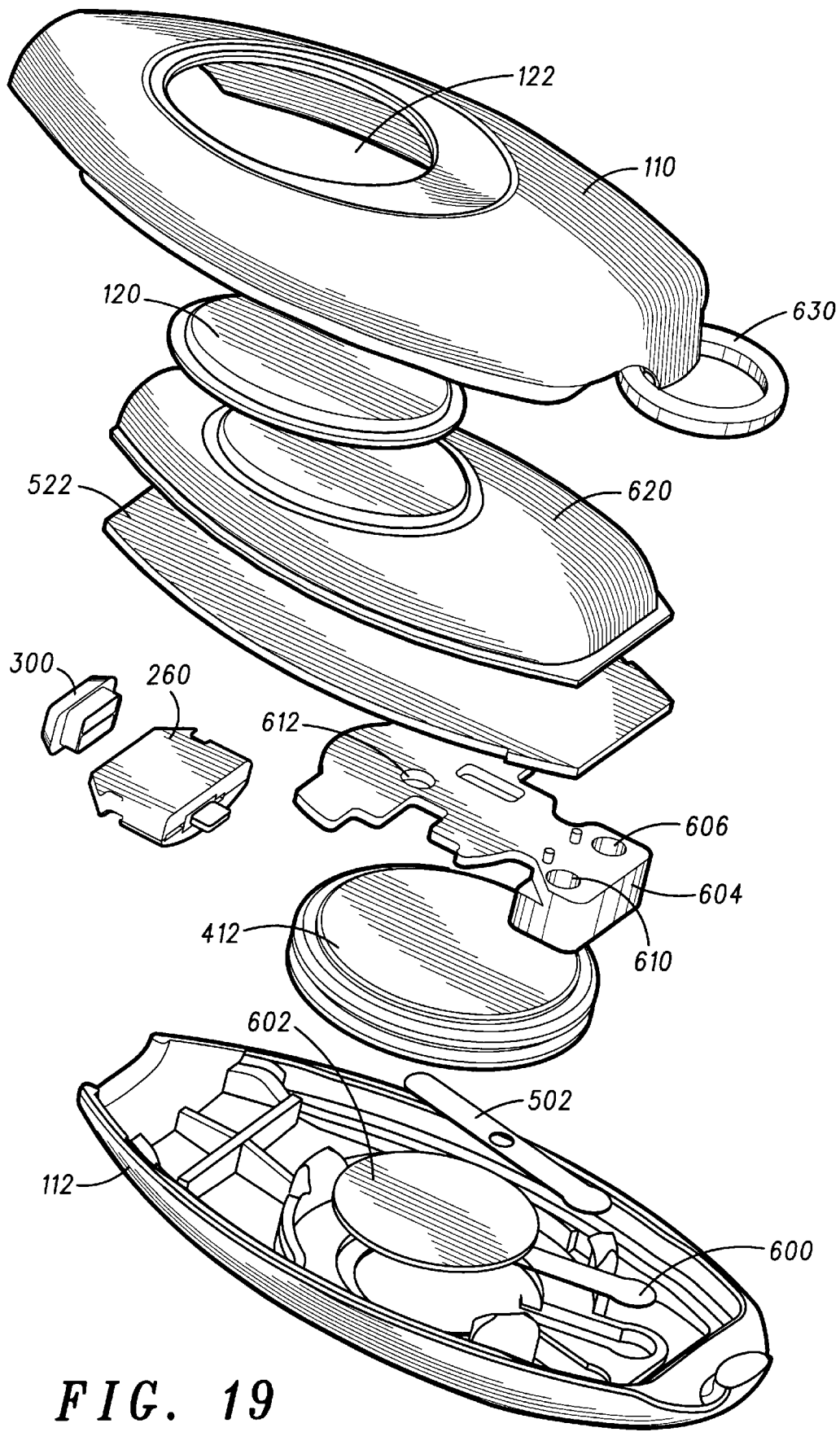
FIG. 19 is an exploded view of the first embodiment of the apparatus.

FIG. 19 is an exploded view of the first embodiment of the apparatus. A first contact 600 is seated on the second housing portion 112. The audible indicator 502 is sandwiched between the first contact 600 and a second contact 602. Preferably, each of the first contact 600 and the second contact 602 comprises a leaf spring contact, such as a gold-plated steel spring contact having part number JJ-68 from Century Springs. Preferably, the audible indicator 502 comprises a disk-shaped buzzer having a positive contact which abuts the second contact 602 and a negative contact which abuts the first contact 600.

The battery 412 rests between the second contact 602 and a battery spacer 604. Preferably, the battery 412 comprises a series combination of two coin cells. A positive terminal of the battery 412 contacts the second contact 602.

The battery spacer 604 includes a first hole 606, a second hole 610, and a third hole 612. The first hole 606 houses a first electrical connection between the first contact 600 and the contact pad 528 of the circuit board 522. The second hole 610 houses a second electrical connection between the second contact 602 and the contact pad 526 of the circuit board 522. The third hole 612 houses a third electrical connection between a negative terminal of the battery 412 and the contact pad 527 of the circuit board 522.

Preferably, each of the electrical connections is provided by a spring. In particular, each of the first electrical connection and the second electrical connection preferably includes a spring formed of gold-plated music wire having 3/32 inch diameter. The third electrical connection preferably includes a gold-plated steel spring with a ground post to provide a ground contact locator.

The circuit board 522 is disposed between the battery spacer 604 and a housing seal 620. Preferably, the housing seal 620 is formed of an elastomer such as silicone rubber or an alternative resilient material. The housing seal 620 inhibits foreign substances from reaching the herein-described electrical components through the opening 122 of the first housing portion 110. Further, by making the housing seal 620 resilient, the switch S1 is responsive to user-initiated actions of the button key top 120.

As illustrated, a split ring 630 is supported within the opening 150. The split ring 630 has a diameter of about 0.43 inches and is made of stainless steel. The split ring 630 can be used to support one or more keys.

FIGS. 20 to 30 describe embodiments of methods performed by embodiments of the apparatus. Many of the steps described with reference to FIGS. 20 to 30 are directed by the microcontroller U1 using machine-readable data including program code stored by a machine-readable storage medium. A preferred embodiment of program code and machine-readable data to direct the microcontroller U1 is provided in the microfiche appendix.

Figure 20:
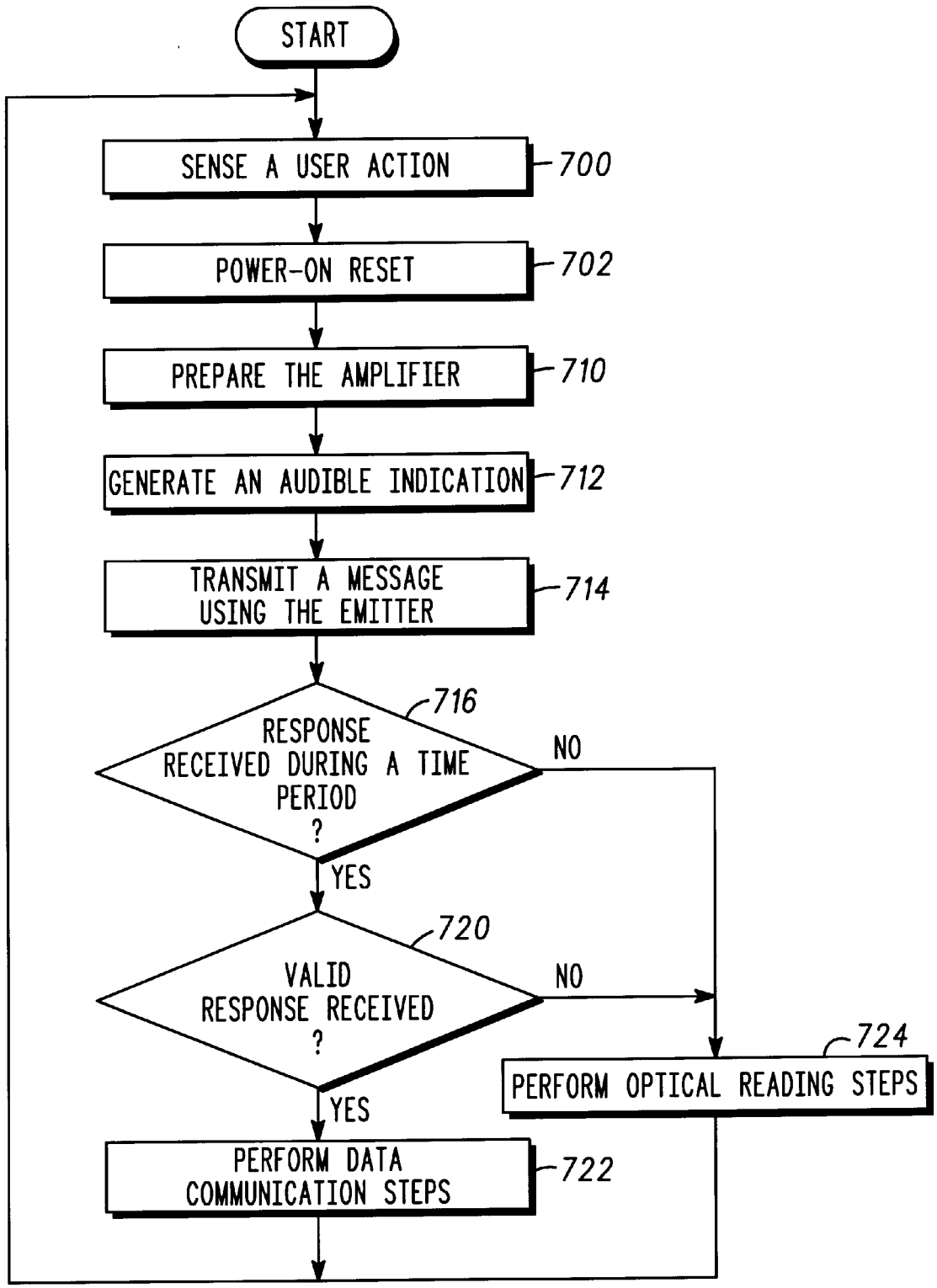
FIG. 20 is a flow chart of an embodiment of a method performed by the apparatus.

FIG. 20 is a flow chart of an embodiment of a method performed by the apparatus. As indicated by block 700, the method includes a step of sensing a user action. Preferably, the user action includes a user-initiated activation of the switch S1 by depressing the button key top 120.

As indicated by block 702, a power-on reset sequence is performed in response to sensing the user action. The power-on reset sequence includes steps of initializing the input/output ports of the microcontroller U1. Preferably, the initialization steps include a step of generating a signal having a high logical level via the output 430. The signal maintains the activation of the voltage regulator U5 if the button key top 120 is released.

The initialization steps further include a step of generating a signal having a high logical level via an output 704 in FIG. 11. The signal is applied to the chip select (CS) input of the memory U2.

The initialization steps further include a step of generating a signal having a high logical level via the output 482. The signal biases the non-inverting input of the operational amplifier U3.

Preferably, the initialization steps further include steps of setting the other outputs of the microcontroller U1 to initially deactivate the emitter 54, the light-emitting diode D2, and the audible indicator 502.

As indicated by block 710, the method includes a step of preparing the amplifier 470 for operation. An embodiment of a method of preparing the amplifier 470 for operation is subsequently described with reference to FIG. 28.

As indicated by block 712, the method includes a step of generating an audible indication. Preferably, the audible indication includes a single tone (e.g. a single beep) generated by the audible indicator 502. The audible indication is generated in response to a logical low voltage signal generated by the microcontroller U1 via the output 506. The audible indication indicates to the end user that the apparatus has been activated.

As indicated by block 714, the method includes a step of transmitting a message using the emitter 54. The microcontroller U1 generates a signal associated with the message via the output 456. By generating the signal via the output 456 rather than the output 454, the message is transmitted with a high intensity. During a period of transmitting the message, the microcontroller U1 generates a constant, high-level signal via the output 454. In this way, the emitter 54 alternates between the high intensity and the low intensity to transmit the message. Preferably, the message includes a predetermined ASCII sequence such as "AAA" transmitted in accordance with an IrDA protocol.

As indicated by block 716, the method includes a step of determining if a response to the message is received within a predetermined time period. The response is optically receivable by the detector 56. In optical code reading situations, no response is received. In data communication situations, a response is received from the external device 44 in optical communication with the emitter 54 and the detector 56. The external device 44 communicates the response using the optical interface 46 to indicate a receipt of the message, and a readiness to receive further data. Preferably, the predetermined time period is about 21000 $\mu$sec.

If a response is received within the predetermined time period, a step of determining if the response is valid is performed (block 720). Preferably, a valid response includes a predetermined ASCII sequence such as "S" transmitted using an IrDA protocol. If the response is valid, then data communication steps are performed as indicated by block 722. The data communication steps are performed to communicate stored data to the external device 44.

In the absence of receiving a response in the predetermined time period, or if an invalid response is received, optical reading steps are performed as indicated by block 724. The optical reading steps are performed to optically read the optical code 40 such as a bar code.

Upon performing either the data communication steps or the optical reading steps, flow of the method is directed back to block 700 so that a subsequent user action can be sensed. One or more of the aforementioned steps can be repeated in response to the subsequent user action.

Figure 21:
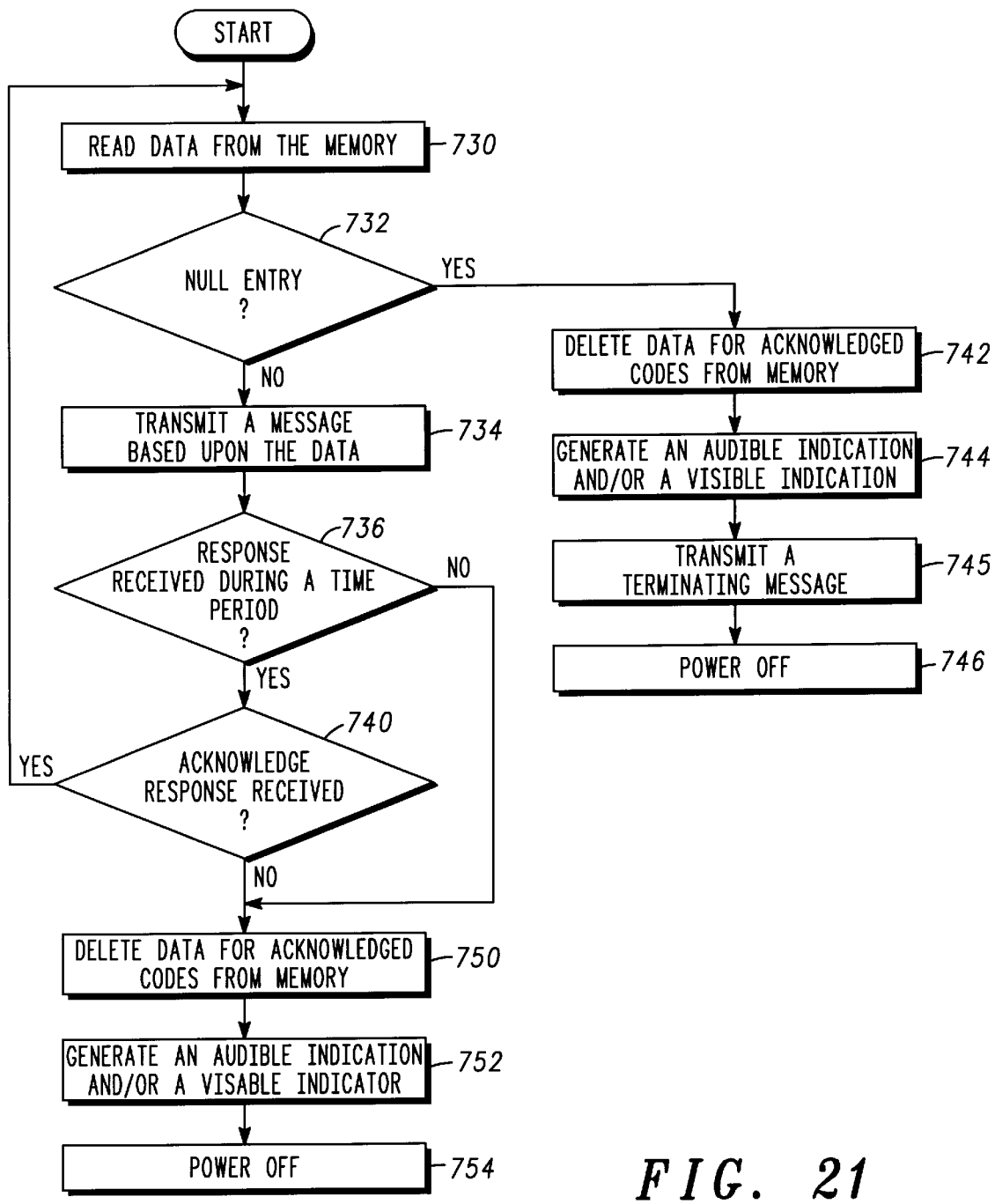
FIG. 21 is a flow chart of an embodiment of data communication steps.

FIG. 21 is a flow chart of an embodiment of data communication steps performed in block 722. As indicated by block 730, a step of reading data from the memory U2 is performed. Preferably, the data is read from the memory U2 by the microcontroller U1 via the SPI bus 498.

As indicated by block 732, a step of determining if the data indicate a null entry is performed. The data indicate a null entry if there are no further codes in the memory U2 to be communicated. If non-indicative of a null entry, the data are associated with a previously-read optical code. In this case, the data include a number of bytes in the main body portion, a plurality of symbols, and a checksum as described with reference to FIGS. 11 and 12.

If the data do not indicate a null entry, a step of transmitting a message based upon the data is performed as indicated by block 734. Preferably, the message is formatted to include symbols associated with the previously-read optical code. The message is formatted as described with reference to FIGS. 11 and 12.

Thereafter, as indicated by block 736, a step of determining if a response to the message is received during a time period is performed. The response is optically receivable by the detector 56. The external device 44 communicates the response either to acknowledge a successful receipt of the message, or to indicate an unsuccessful receipt of the message. Preferably, the time period is about 21000 μsec.

If the response is received during the time period, a step of determining if the response acknowledges receipt of the message is performed (block 740). Preferably, an acknowledge response includes a predetermined ASCII sequence, such as an "A", transmitted in accordance with an IrDA protocol. If the response acknowledges a successful receipt of the message, flow of the process is directed back to block 730. Thereafter, further data are read from the memory U2. The further data can be associated with either another previously-read optical code or can indicate that no further codes are to be communicated.

Referring back to block 732, if the data read from the memory U2 indicate a null entry (or otherwise indicate that no further codes are to be communicated), an optional step of deleting data for all acknowledged codes is performed as indicated by block 742. The data are deleted from the memory U2.

Further, as indicated by block 744, a step of generating a first audible indication and/or a first visible indication is performed. The first audible indication and/or the first visible indication indicates to the end user that all of the optical codes stored by the memory U2 have been communicated and acknowledged by the external device 44. Preferably, the first audible indication includes a single tone, e.g. a single beep, generated by the audible indicator 502. The first audible indication is generated in response to a logical low level signal generated by the microcontroller U1 via the output 506. Preferably, the first visible indication includes a single flash displayed by the LED D2. The first visible indication is generated in response to a signal generated by the microcontroller U1 via the output 504.

As indicated by block 745, a step of transmitting a terminating message is performed. Preferably, the terminating message includes a zero-length message transmitted in accordance with an IrDA protocol. The terminating message indicates to the external device 44 that all of the optical codes stored by the memory U2 have been communicated.

As indicated by block 746, a power-off process is performed. The power-off process includes deactivating the analog-to-digital converter 60, the chip select to the memory U2, the emitter 54, the LED D2, the audible indicator 502, and the output 430. The microcontroller U1 enters a sleep mode, and can be subsequently awakened in response to the switch S1.

Referring back to blocks 736 and 740, if no response was received during the time period (block 736) or if the response indicates that the message was unsuccessfully received (block 740), then steps indicated by blocks 750, 752, and 754 are performed.

Block 750 indicates an optional step of deleting data for all acknowledged codes. The data are deleted from the memory U2. Data associated with unacknowledged codes are not deleted from the memory U2.

Block 752 indicates a step of generating a second audible indication and/or a second visible indication. The second audible indication and/or the second visible indication indicates to the end user that some of the optical codes stored by the memory U2 were unsuccessfully communicated to the external device 44. Preferably, the second audible indication includes a series of three tones, e.g. three beeps, generated by the audible indicator 502. Each tone in the second audible indication is generated in response to a logical low level signal generated by the microcontroller U1 via the output 506. Preferably, the second visible indication includes a series of three flashes displayed by the LED D2. The second visible indication is generated in response to a signal generated by the microcontroller U1 via the output 504.

As indicated by block 754, a step of performing a power-off process is performed. The power-off process is performed as described with reference to block 746.

Figure 22:
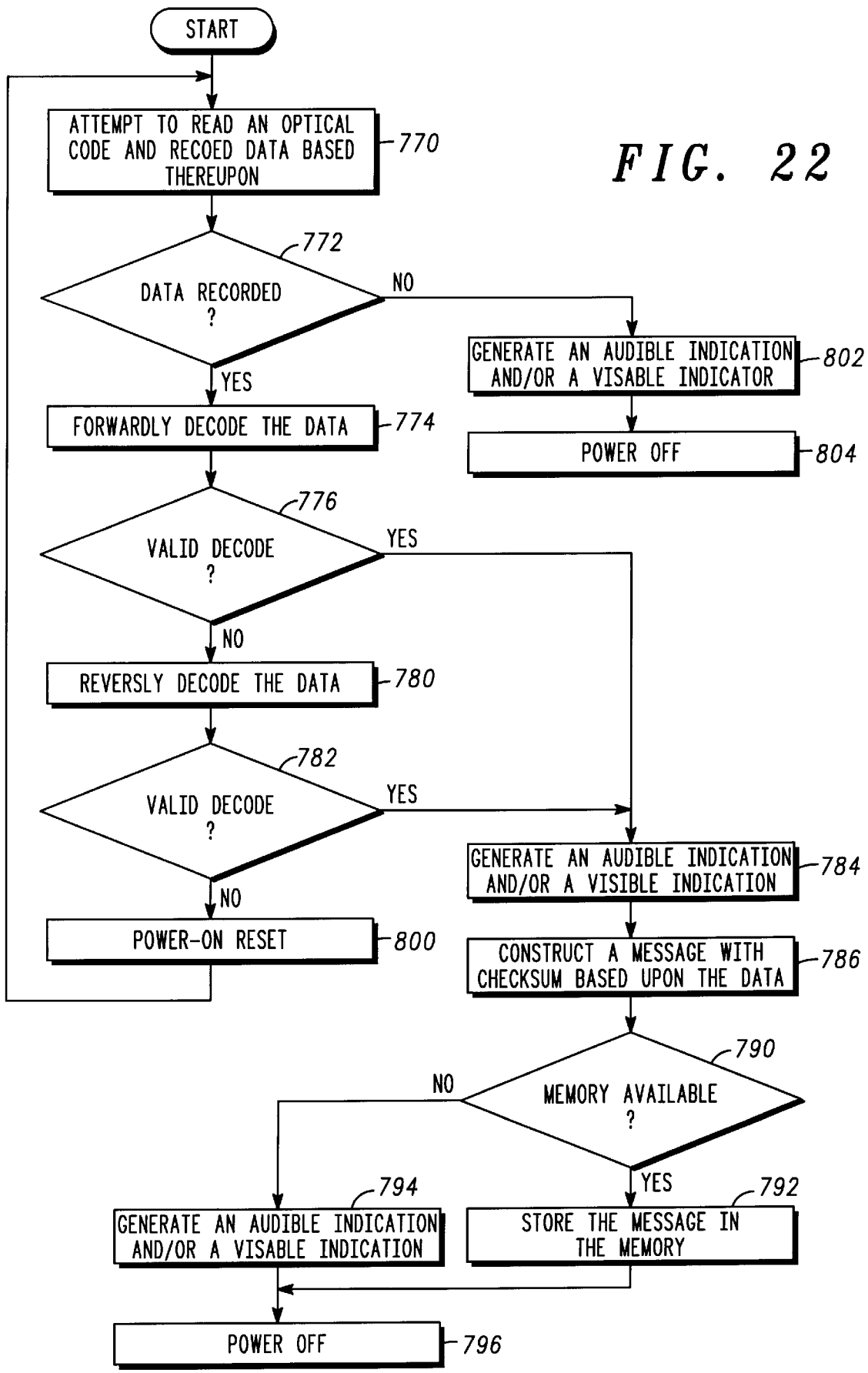
FIG. 22 is a flow chart of an embodiment of optical reading steps.

FIG. 22 is a flow chart of an embodiment of optical reading steps performed in block 724. As indicated by block 770, a step of attempting to read an optical code and to record data based upon the optical code is performed. An embodiment of a method of attempting to read the optical code and to record data based upon the optical code is subsequently described with reference to FIGS. 23 and 24.

As indicated by block 772, a step of determining if width-between-edges data based upon an optical code have been recorded. If a sufficient amount of width-between-edges data have been recorded (e.g. two or more bytes), a step of forwardly decoding the data is performed as indicated by block 774. In this step, data based upon the optical code are decoded as if the optical code was read in a first direction, such as from left to right. Preferably, the optical code is forwardly decoded in accordance with UPC/EAN bar code standards, although additional and/or alternative optical code standards can also be used.

As indicated by block 776, the method includes a step of determining if the step of forwardly decoding the data has produced a valid decode. If the decode is invalid, a step of reversely decoding the data is performed as indicated by block 780. In this step, data based upon the optical code are decoded as if the optical code was read in a second direction opposite to the first direction, such as from right to left. Preferably, the optical code is reversely decoded in accordance with UPC/EAN bar code standards, although additional and/or alternative optical code standards can also be used.

As indicated by block 782, the method includes a step of determining if the step of reversely decoding the data has produced a valid decode. If a valid decode is determined in either forwardly (block 776) or reversely (block 782), a step of generating a first audible indication and/or a first visible indication is performed as indicated by block 784. The first audible indication and/or the first visible indication indicates to the end user that the optical code has been read and validly decoded. Preferably, the first audible indication includes a single tone, e.g. a single beep, generated by the audible indicator 502. The first audible indication is generated in response to a logical low level signal generated by the microcontroller U1 via the output 506. Preferably, the first visible indication includes a single flash displayed by the LED D2. The first visible indication is generated in response to a signal generated by the microcontroller U1 via the output 504.

As indicated by block 786, the method includes a step of constructing a message based upon the decoded data. Preferably, the message is formatted to include a number of bytes in the main body portion, a plurality of symbols in the decoded data, and a checksum as described with reference to FIGS. 11 and 12.

As indicated by block 790, the method includes a step of determining if memory space is available to store the message in the memory U2. If sufficient space is available, a step of storing the message in the memory U2 is performed as indicated by block 792. If insufficient space is available, a step of generating a second audible indication and/or a second visible indication is performed as indicated by block 794. The second audible indication and/or the second visible indication indicates to the end user that insufficient memory space is available for storing a message associated with the optical code. Preferably, the second audible indication includes a series of three tones, e.g. three beeps, generated by the audible indicator 502. Each tone in the second audible indication is generated in response to a logical low level signal generated by the microcontroller U1 via the output 506. Preferably, the second visible indication includes a series of three flashes displayed by the LED D2. The second visible indication is generated in response to a signal generated by the microcontroller U1 via the output 504.

It is also preferred that the generation of the second indications be delayed for a time duration after the first indications were generated. This makes both the first indications and the second indications distinguishable to the end user.

After either storing the message in the memory U2 (block 792) or indicating insufficient memory space (block 794), a power-off process is performed as indicated by block 796. The power-off process is performed as described with reference to block 746 in FIG. 21.

Referring back to block 782, if an invalid decode is produced both forwardly and reversely, a power-on reset process is performed as indicated by block 800. The power-on reset process is performed as described with reference to block 702 in FIG. 20. Thereafter, flow of the method is directed back to block 770 to subsequently attempt to read an optical code and to record data based thereupon.

Referring back to block 772, if an insufficient amount of width-between-edges data have been recorded (e.g. less than two bytes), a step of generating a second audible indication and/or a second visible indication is performed as indicated by block 802. The second audible indication and/or the second visible indication indicates to the end user that the optical code was unsuccessfully read and/or unsuccessfully decoded. Preferably, the second audible indication includes a series of three tones, e.g. three beeps, generated by the audible indicator 502. Each tone in the second audible indication is generated in response to a logical low level signal generated by the microcontroller U1 via the output 506. Preferably, the second visible indication includes a series of three flashes displayed by the LED D2. The second visible indication is generated in response to a signal generated by the microcontroller U1 via the output 504. After generating the audible and/or visible indication, a power-off process is performed as indicated by block 804. The power-off process is performed as described with reference to block 746 in FIG. 21.

Figure 23:
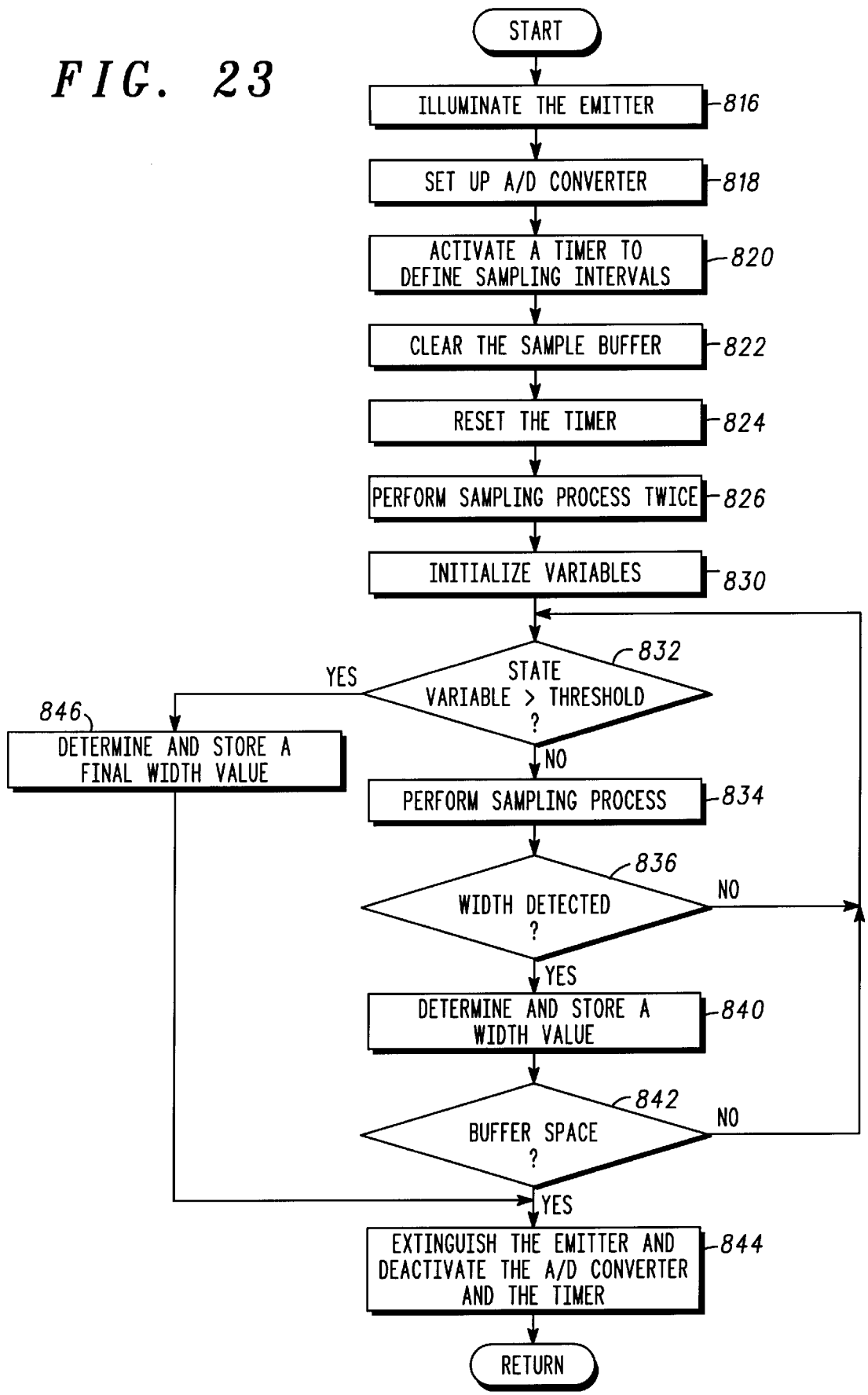
FIG. 23 is a flow chart of an embodiment of a method of reading optical data and recording data based upon the optical data.

FIG. 23 is a flow chart of an embodiment of a method of reading optical data and recording data based upon the optical data. As indicated by block 816, a step of illuminating the emitter 54 is performed. The emitter 54 is illuminated with a low intensity by generating a logical high signal using the output 454.

As indicated by blocks 818 and 820, the method includes steps of setting up the analog-to-digital converter 60 and activating a timer. Preferably, the timer is provided by the microcontroller U1.

The timer is used to define sampling intervals. The analog-to-digital converter 60 is used to convert analog signals received at the input 492 to a digital representation.

As indicated by block 822, the method includes a step of clearing a sample buffer. The sample buffer includes a plurality of memory locations in the microcontroller U1 to store data based upon the analog signals received at the input 492.

As indicated by block 824, the method includes a step of resetting the timer. The timer is reset to initiate a first sampling interval.

As indicated by block 826, the method includes a step of twice performing a sampling process. An embodiment of a method of performing the sampling process is subsequently described with reference to FIG. 24. The sampling process is performed twice to generate two initial samples from which processed data is produced (as subsequently described with reference to block 864 in FIG. 24).

As indicated by block 830, a step of initializing variables is performed. This step includes resetting a sample count to zero, resetting a state variable to zero, setting a light_to_dark variable to zero, and setting a dark_to_light variable to zero. The sample count indicates the number of sample values generated in reading the optical code. The state variable (herein denoted by lengthState) is based upon a number of sample values generated during an identified state of reading the optical code. The light_to_dark variable is based upon a sample count at which a light-to-dark transition is sensed. The dark_to_light variable is based upon a sample count at which a dark-to-light transition is sensed.

As indicated by block 832, a step of comparing the state variable to a threshold is performed. Preferably, the threshold is dependent upon an identified state in reading the optical code. A first threshold, herein referred to as MAX_DWELL_FIRST, is used when in a state of searching for the start (e.g. a first edge transition) of a bar code. A second threshold, herein referred to as MAX_DWELL_STATE, is used in states after which the start of a bar code is sensed.

If the state variable has not exceeded the threshold (i.e. if the state variable is less than or equal to the threshold), then the sampling process is performed as indicated by block 834. A sample value, a processed value, an updated sample count, and an updated state variable result from the sampling process.

As indicated by block 836, the method includes a step of determining if either a bar width or a space width is detected in the optical code. This step includes determining if an edge is detected in the optical code using the edge detection process described with reference to FIGS. 11 and 12, and subsequently described with reference to FIGS. 25 and 26. The width of a bar or a space is based upon, and preferably indicates, a number of sample counts between successively-detected edges.

If neither a bar width nor a space width is detected in this step, flow of the method is directed back to block 832. If either a bar width or a space width is detected, steps of determining and storing a width-between-edges value is performed as indicated by block 840. The width-between-edges value is stored in the sample buffer.

As indicated by block 842, the method includes a step of determining if the sample buffer has available space to store an additional width-between-edges value. If the sample buffer has sufficient available space, flow of the method is directed to block 832.

If the sample buffer has insufficient available space in block 842, no further sample values are generated in the current attempt to read the optical code. Thereafter, steps of extinguishing the emitter 54, and deactivating the analog-to-digital converter 60 and the timer are performed (as indicated by block 844). These steps are beneficial in reducing power consumption by the emitter 54 and the microcontroller U1.

Referring back to block 832, if the state variable has exceeded the threshold (e.g. the state variable is greater than the threshold), no further sample values are generated in the current attempt to read the optical code. Preferably, the first threshold MAX_DWELL_FIRST is set so that no further sample values are generated after about 5 seconds of attempting to detect the start of a bar code. Preferably, the second threshold MAX_DWELL_STATE is set so that no further sample values are generated after about 0.12 seconds of attempting to detect a width value.

Thereafter, as indicated by block 846, a step of determining and storing a final width value is performed. The final width value is equal to the difference between the final sample count and the sample count at which the last edge is detected. The final width value represents the width of either the last dark bar or the last light bar. Further, the steps of extinguishing the emitter 54, and deactivating the A/D converter 60 and the timer are performed as indicated by block 844.

FIG. 24 is a flow chart of an embodiment of a sampling process. As indicated by block 860, the method includes a step of detecting the start of a sampling interval. The start of the sampling interval is detected using the timer. Preferably, each sampling interval is selected to have a duration of about 100 μsec. Thereafter, as indicated by block 862, a step of reading a sample value from the analog-to-digital converter 60 is performed.

As indicated by block 864, a step of processing at least one previously-sampled value is performed. The at least one previously-sampled value is sensed by the analog-to-digital converter 60 from at least one previous sampling interval. Preferably, this step includes determining a difference between a most-recently-sampled value and a predecessor sample thereto. In an exemplary embodiment, the at least one previously-sampled value is processed in accordance with the formula (S0–S2)/2, where S0 is the most-recently-sampled value, and S2 represents the sample value obtained two sampling intervals prior to S0. The processed value is determined based upon the aforementioned formula and represented by a variable. Alternatively, the at least one previously-sampled value is processed in accordance with the formula (S0–S1) wherein S1 represents the sample value from the sampling interval immediately prior to S0.

The step of processing the previous sample value further includes incrementing the sample count indicating the number of sample values, and incrementing the state variable. Further, a record of the two most-recent sampled values is maintained for processing in a subsequent sampling interval.

As indicated by block 870, a step of triggering the analog-to-digital converter 60 is performed.

FIGS. 25 and 26 illustrate pseudo-code representations of embodiments of methods of detecting a width-between-edges. FIG. 25 illustrates an embodiment of a method of detecting a dark, bar width. FIG. 26 illustrates an embodiment of a method of detecting a light, space width.

These methods are performed after the first edge of a bar code is sensed. The first edge of a bar code is sensed by detecting when the difference variable either is less than a darkThreshold value or is greater than a lightThreshold value. If the difference variable is less than the darkThreshold value, a signal state variable (herein denoted by signalState) is set to FIND_DARK_MIN. If the difference variable is greater than the lightThreshold value, the signal state variable is set to FIND_LIGHT_MAX.

Based upon the signal state variable, one of these two methods is selected and performed. In particular, the method described with reference to FIG. 25 is performed if the signal state variable is equal to FIND_DARK_MIN. The method described with reference to FIG. 26 is performed if the signal state variable is equal to FIND_LIGHT_MAX. Upon first performing these methods, a maximum difference variable (herein denoted by maxDiffer) is initialized to zero.

Referring to FIG. 25, the method includes a step 900 of determining if the signal is getting darker. If the signal is getting darker, a step 902 of determining if the absolute value of the difference variable is less than the darkThreshold value. If the absolute value of the difference variable is less than the darkThreshold value, a step 904 of terminating the method is performed.

Step 906 includes determining if the absolute value of the difference variable is greater than the maximum difference value. If the absolute value of the difference variable is greater than the maximum difference value, steps 910 of setting the maximum difference value equal to the absolute value of the difference value, setting a light_to_dark variable equal to the sample count value (herein denoted by sampleNumber), and setting a lastDifferAt variable equal to the sampleNumber value are performed.

If the absolute value of the difference variable is equal to the maximum difference value (step 912), a step 914 of setting the lastDifferAt variable equal to the sampleNumber value is performed. After performing either the steps 910 or the step 914, a step 916 of terminating the method is performed.

Referring back to step 900, if the signal is not getting darker, a step 920 of determining if the difference variable is less than or equal to the lightThreshold value is performed. If the difference variable is less than or equal to the lightThreshold value, a step 922 of terminating the method is performed. Otherwise, a step 924 of setting the light_to_dark variable equal to the average of the lastDifferAt value and the light_to_dark value is performed.

If a previous dark-to-light transition is known, a step 926 of determining and storing a width value is performed. The width value is equal to a difference between the light_to_dark value and a dark_to_light value. A previous dark-to-light transition is known if the method of FIG. 26 has been performed.

Thereafter, steps 930 of setting the signal state variable to FIND_LIGHT_MAX, setting the lengthState value to zero, setting the maxDiffer value to the absolute value of the difference variable, setting the dark_to_light variable equal to the sample count, setting the lastDifferAt variable equal to the sample count, and terminating the method are performed.

In summary, the method of FIG. 25 determines the first and last sample count values for which the difference variable is most negative (i.e. where the signal is making the fastest rate of change toward darkness). Once the difference variable indicates a definite change toward light, then the average of the first and last sample count values for which the difference variable is most negative is computed to determine an edge location. Thereafter, the signal state variable is changed so that the method of FIG. 26 is subsequently performed.

Referring to FIG. 26, the method includes a step 940 of determining if the signal is getting lighter. If the signal is getting lighter, a step 942 of determining if the absolute value of the difference variable is less than the lightThreshold value. If the absolute value of the difference variable is less than the lightThreshold value, a step 944 of terminating the method is performed.

Step 946 includes determining if the absolute value of the difference variable is greater than the maximum difference value. If the absolute value of the difference variable is greater than the maximum difference value, steps 950 of setting the maximum difference value equal to the absolute value of the difference value, setting a dark_to_light variable equal to the sample count value, and setting a lastDifferAt variable equal to the sampleNumber value are performed.

If the absolute value of the difference variable is equal to the maximum difference value (step 952), a step 954 of setting the lastDifferAt variable equal to the sampleNumber value is performed. After performing either the steps 950 or the step 954, a step 956 of terminating the method is performed.

Referring back to step 940, if the signal is not getting lighter, a step 960 of determining if the absolute value of the difference variable is less than or equal to the darkThreshold value is performed. If the absolute value of the difference variable is less than or equal to the darkThreshold value, a step 962 of terminating the method is performed. Otherwise, a step 964 of setting the dark_to_light variable equal to the average of the lastDifferAt value and the dark_to_light value is performed.

If a previous light_to_dark transition is known, a step 966 of determining and storing a width value is performed. The width value is equal to a difference between the dark_to_light value and a light_to_dark value. A previous dark-to-light transition is known if the method of FIG. 25 has been performed.

Thereafter, steps 970 of setting the signal state variable to FIND_DARK_MIN, setting the lengthState value to zero, setting the maxDiffer value to the absolute value of the difference variable, setting the light_to_dark variable equal to the sample count, setting the lastDifferAt variable equal to the sample count, and terminating the method are performed.

In summary, the method of FIG. 26 determines the first and last sample count values for which the difference variable is most positive (i.e. where the signal is making the fastest rate of change toward lightness). Once the difference variable indicates a definite change toward darkness, then the average of the first and last sample count values for which the difference variable is most positive is computed to determine an edge location. Thereafter, the signal state variable is changed so that the method of FIG. 25 is subsequently performed.

Figure 27:
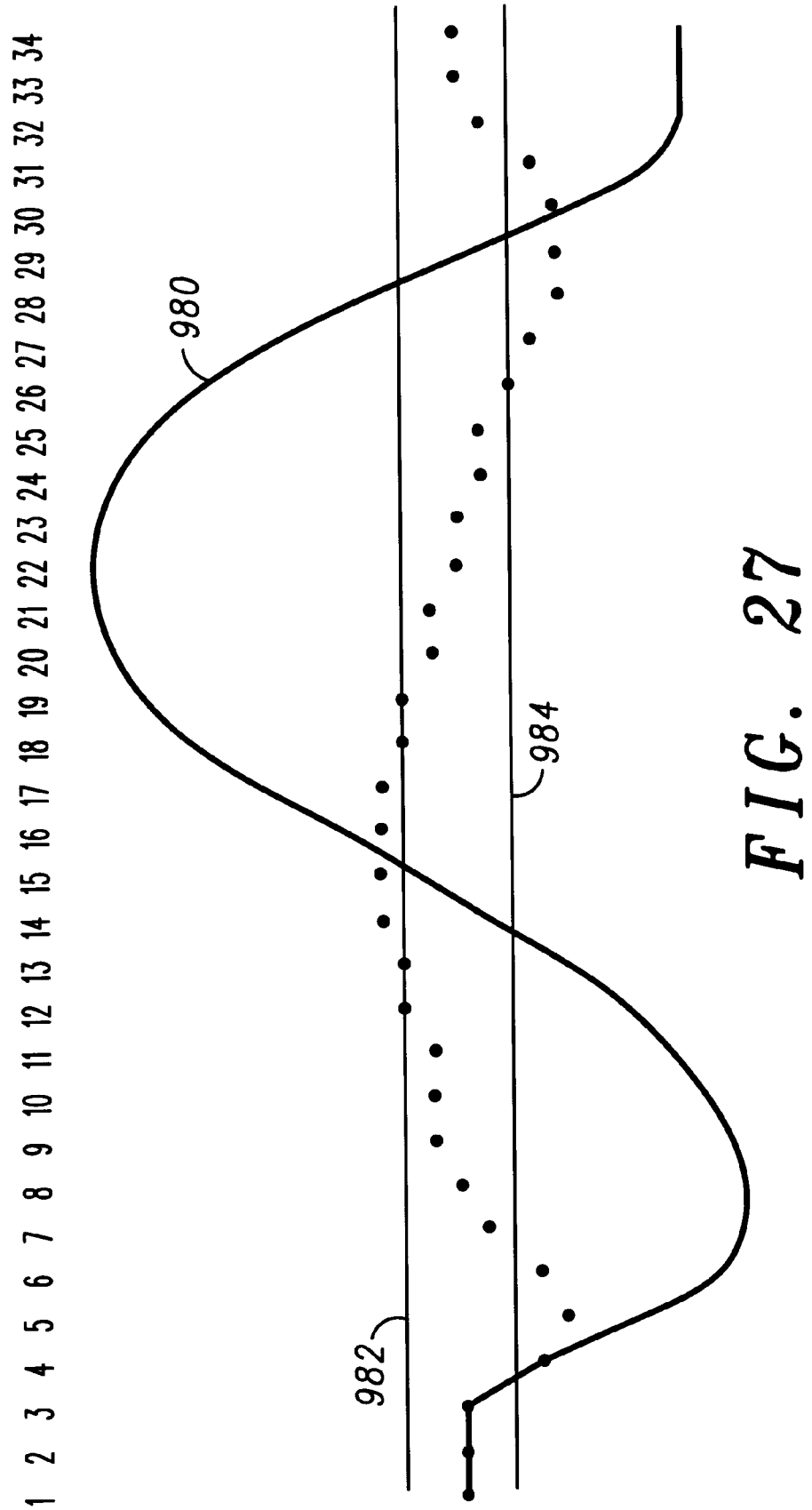
FIG. 27 is a graph of an example illustrating an edge detection process.

FIG. 27 is a graph of an example illustrating an edge detection process. A curve 980 indicates an averaged signal vs. time based upon signals applied to the input 492 of the microcontroller U1. The dots indicate values of the difference variable for 34 different samples of the curve 980. A line 982 indicates the lightThreshold value. A line 984 indicates the darkThreshold value. At sample number 4, the difference variable is less than the darkThreshold value. Thereafter, the signal state variable is set to FIND_DARK_MIN, and the method of FIG. 25 is performed. The method of FIG. 25 determines that the difference variable has a unique local minimum value at sample number 5. Therefore, the light_to_dark value is set to 5. Since there is no previous dark-to-light transition, no width value is stored. The signal state variable is set to FIND_LIGHT_MAX so that the method of FIG. 26 is subsequently performed.

The method of FIG. 26 determines that the first sample count at which the difference variable is most positive is 14, and the last sample count at which the difference variable is most positive is 17. Therefore, the dark_to_light value is set to (14+17)/2 which is 15.5. A width value of 15.5−5=10.5 is stored. The signal state variable is set to FIND_DARK_MIN so that the method of FIG. 25 is subsequently performed.

The method of FIG. 25 determines that the first sample count at which the difference variable is most negative is 28, and the last sample count at which the difference variable is most negative is 30. Therefore, the light_to_dark value is set to (28+30)/2 which is 29. A width value of 29−15.5=13.5 is stored. The signal state variable is set to FIND_LIGHT_MAX so that the method of FIG. 26 is subsequently performed.

FIG. 28 is a pseudo-code representation of an embodiment of a method of preparing the amplifier 470 for operation. The microcontroller U1 performs the method so that the voltage level of the output 490 is in a central portion of the available output voltage range of the amplifier 470, and a central portion of the input range of the analog-to-digital converter 60.

The method includes a step 1000 of generating a signal at the output 454 to activate the emitter 54 with a low intensity. Step 1002 comprises providing a high impedance at, or otherwise isolating the output 478 (i.e. tri-stating the output 478) to disable a low-gain mode of the amplifier 470. Step 1004 comprises initializing the analog-to-digital converter 60.

Step 1006 comprises initializing a logical variable (herein denoted by LastSampleWasHigh) to TRUE. The logical variable indicates if the last sample exceeds an upper threshold. Step 1010 comprises initializing a count variable (herein denoted by mByteCount) to a predetermined value such as 128. Step 1011 comprises initializing a loop count variable (herein denoted by mLoopCount) to a predetermined value such as 5000.

A block of subsequent steps is performed one or more times while the count variable is not equal to zero and the loop count variable is not equal to zero. The loop count variable is used to limit the number of times that the block of steps is performed should the count variable not attain zero.

A step 1012 of waiting a predetermined time period, such as 60 microseconds, for circuitry to settle, and a step 1014 of getting a sample from the analog-to-digital converter 60 thereafter, are performed. The sample is based upon the voltage at the output 490 of the amplifier 470 received by the input 492.

A step 1016 of determining if the sample is less than a lower threshold, such as 112, is performed. If the sample is less than the lower threshold, a step 1020 of right-shifting the count variable is performed if the LastSampleWasHigh value is a logical TRUE. By right-shifting a non-unity count variable, the count variable is reduced by half of its value in this step. If the count variable is unity, the count variable is reduced to zero in this step. Thereafter, a step 1022 of setting the LastSampleWasHigh variable to a logical FALSE is performed.

If the count variable is non-zero, a step 1024 of generating a low level signal at the output 480 is performed. The low level signal is provided at the output 480 for a duration based upon the count variable. Preferably, the duration is proportional to the count variable, and is equal to the product of the count variable and 20 microseconds. The low level signal decreases the voltage at the inverting input of the operational amplifier U3, and thereby increases the voltage at the output 490 of the amplifier 470. Thereafter, a step 1026 of providing a high impedance at, or otherwise isolating the output 480 (i.e. tri-stating the output 480) is performed.

Thereafter, as indicated by step 1030, flow of the method is directed back to step 1012 while the count variable is nonzero and a decremented loop count value is nonzero. The loop count value is decremented each time step 1030 is performed. If the count variable is equal to zero or if the decremented loop count value is equal to zero, steps 1031 of tri-stating the outputs 478 and 480 are performed, and the method is terminated.

Referring back to the step 1016, if the sample is not less than the low threshold, a step 1032 of determining if the sample is greater than the upper threshold, such as 144, is performed. If the sample is greater than the upper threshold, a step 1034 of right-shifting the count variable is performed if the LastSampleWasHigh value is a logical FALSE. By right-shifting a non-unity count variable, the count variable is reduced by half of its value in this step. If the count variable is unity, the count variable is reduced to zero in this step. Thereafter, a step 1036 of setting the LastSample-WasHigh variable to a logical TRUE is performed.

If the count variable is non-zero, a step 1040 of generating a high level signal at the output 480 is performed. The high level signal is provided at the output 480 for a duration of based upon the count variable. Preferably, the duration is proportional to the count variable, and is equal to the product of the count variable and 20 microseconds. The high level signal increases the voltage at the inverting input of the operational amplifier U3, and thereby decreases the voltage at the output 490 of the amplifier 470. Thereafter, a step 1042 of providing a high impedance at, or otherwise isolating the output 480 (i.e. tri-stating the output 480) is performed.

Thereafter, as indicated by step 1030, flow of the method is directed back to step 1012 while the count variable is nonzero and the decremented loop count variable is nonzero. If the count variable is equal to zero or if the decremented loop count variable is equal to zero, the steps 1031 are performed and the method is terminated.

If the sample is inclusively between the low threshold and the high threshold (step 1044), then the amplifier 470 is prepared for operation and the method is terminated.

FIG. 29 is a flow chart of an embodiment of a method of transmitting a bit within a message. The microcontroller U1 performs the method a plurality of times, once for each of a plurality of bits of data, to transmit an entire message. The method is performed at times in accordance with a predetermined bit rate. Prior to commencing the method, the microcontroller U1 generates a high level signal at the output 454 to illuminate the emitter 54 with a low intensity.

As indicated by block 1050, a step of determining a value of the bit is performed. If the value of the bit is zero, then steps indicated by blocks 1052, 1054, 1056 and 1060 are performed.

Block 1052 indicates a step of generating a high level signal at the output 478. This step causes the amplifier 470 to operate in a low gain mode.

Block 1054 indicates a step of generating a high level signal at the output 478. This step acts to illuminate the emitter 54 with a high intensity.

Block 1056 indicates a step of maintaining a high level signal at the output 482. This step acts to provide a positive bias voltage to the non-inverting input of the operational amplifier U3.

Block 1060 indicates a step of waiting a predetermined time period. Preferably, the predetermined time period has a duration of about 20 microseconds.

After waiting the predetermined time period, a step of providing a high impedance at the output 456, or otherwise isolating or tri-stating the output 456 is performed, as indicated by block 1062. As a result, the emitter 54 is illuminated with the low intensity.

As indicated by block 1064, a step of providing a high impedance at the output 478, or otherwise isolating or tri-stating the output 478 is performed. As a result, the low gain mode is disabled for the amplifier 470.

Referring back to block 1050, if the value of the bit is one, then the steps indicated by blocks 1062 and 1064 are performed.

FIG. 30 is a pseudo-code representation of an embodiment of a method of fine tuning the amplifier 470 when transmitting an IrDA stop bit. Transmitting an IrDA stop bit comprises transmitting a "1" bit.

The method is directed by the microcontroller U1 to modify a charge stored by the capacitor RC1. The charge is modified to compensate for feedback of an IrDA signal transmitted by the emitter 54.

The method includes a step 1080 of starting an analog-to-digital conversion, and a step 1082 of waiting a predetermined time period. Preferably, the predetermined time period is about a quarter of a bit period. By waiting the predetermined time period, circuitry associated with the analog-to-digital converter 60 is allowed to settle.

Once the analog-to-digital conversion has completed, a step 1084 of reading a sample from the analog-to-digital converter 60 is performed. Step 1086 comprises maintaining a high level signal at the output 482. This step acts to provide a positive bias voltage to the non-inverting input of the operational amplifier U3.

Step 1090 comprises providing a high impedance at the output 456, or otherwise isolating or tri-stating the output 456. As a result, the emitter 54 is illuminated with the low intensity.

Step 1092 comprises comparing the sample to the high threshold described with reference to FIG. 28. Preferably, the high threshold is 144. If the sample is greater than the high threshold, then a step 1094 of generating a high level signal at the output 480 is performed for a predetermined time period. Preferably, the predetermined time period is about 3 microseconds. This step acts to increase the voltage at the inverting input of the operational amplifier U3, and thus, to decrease the voltage at the output 490.

Step 1096 comprises comparing the sample to the low threshold described with reference to FIG. 28. Preferably, the low threshold is 112. If the sample is less than the low threshold, then a step 1100 of generating a low level signal at the output 480 is performed for a predetermined time period. Preferably, the predetermined time period is about 3 microseconds. This step acts to decrease the voltage at the inverting input of the operational amplifier U3, and thus, to increase the voltage at the output 490.

Step 1102 comprises providing a high impedance at the output 480, or otherwise isolating or tri-stating the output 480.

In summary, the method attempts to maintain the voltage level of the output 490 in a central portion of the available output voltage range of the amplifier 470, and a central portion of the input range of the analog-to-digital converter 60.

Figure 31:
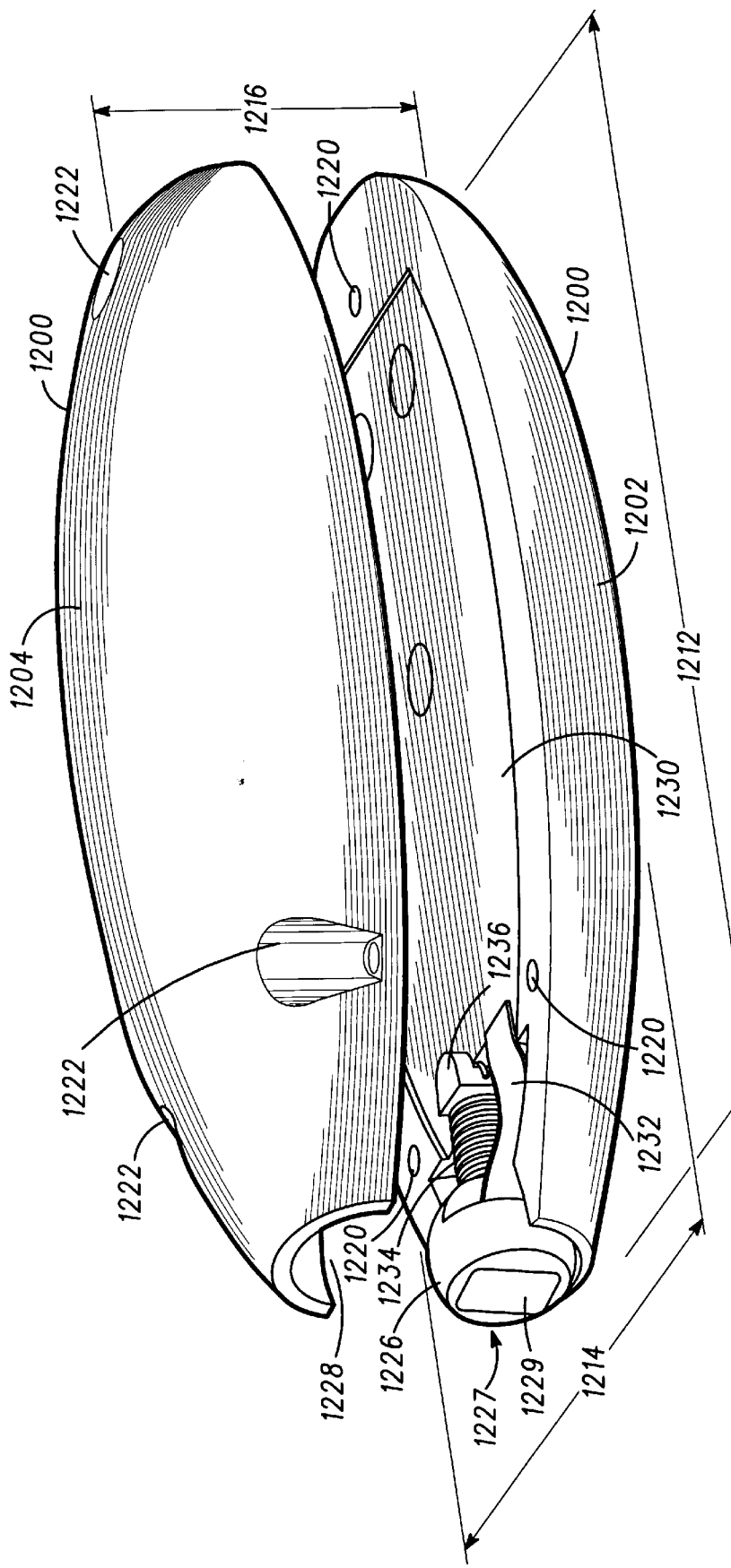
FIG. 31 is an exploded view of a second embodiment of the apparatus.

FIG. 31 is an exploded view of a second embodiment of the apparatus. The apparatus comprises a housing 1200 including a first housing portion 1202 and a second housing portion 1204. Preferably, the first housing portion 1202 and the second housing portion 1204 are formed of plastic such as injection molded ABS/PC. It is noted, however, that the housing 1200 can be formed from alternative materials using alternative processes.

The housing 1200 defines a major dimension 1212, an intermediate dimension 1214, and a minor dimension 1216 which are mutually orthogonal. The major dimension 1212 is longer than both the intermediate dimension 1214 and the minor dimension 1216. The intermediate dimension 1214 is longer than the minor dimension 1216. In an exemplary version of the second embodiment, the major dimension 1212 has a length of about 2 inches, the intermediate dimension 1214 has a length of about 1 _ inches, and the minor dimension 1216 has a length of about _ inch. The housing 1200 has a generally ovular shape spanning the major dimension 1212 and the intermediate dimension 1214.

The size and shape of the housing 1200 are amenable for grasping by an end user in a manner similar to grasping a writing implement such as a pen, a pencil, or a stylus. Alternatively, the housing 1200 can be grasped in a manner similar to grasping a guitar pick. The size and shape of the housing 1200 are also amenable for carrying by the end user in a pocket or a purse.

The first housing portion 1202 and the second housing portion 1204 fit together in a clam shell manner to define opposite faces of the housing 1200. The first housing portion 1202 is secured to the second housing portion 1204 using a plurality of fasteners (not illustrated) such as screws. The first housing portion 1202 defines a plurality of fastener-receiving holes 1220 and the second housing portion 1204 defines a plurality of corresponding fastener-receiving holes 1222 to receive the plurality of fasteners.

The housing 1200 houses or otherwise supports an optical reader including an optical head 1226 at a reading end 1227. The optical reader is used to read the optical code 40 from the external device 42. The optical head 1226 is also employed to communicate optical signals with external devices having an optical interface, such as the external device 44 having the optical interface 46. The housing 1200 has an opening 1228 at which the optical head 1226 is disposed.

The optical head 1226 includes a housing 1229 having the emitter 54 and the detector 56. Preferably, the housing 1229 is based upon the housing 300 described with reference to FIG. 10. In particular, it is preferred that the housing 1229 provides two apertures as described with reference to FIG. 10. The external surface of the housing 1229 provides a substantially flat surface to contact a surface supporting the optical code 40.

The housing 1200 at least partially houses one or more circuits electrically connected to the optical head 1226. Preferably, the circuits include the circuits described with reference to FIGS. 11 and 12. The circuits are disposed on at least one circuit board 1230. Preferably, the at least one circuit board 1230 is based upon the double-sided circuit board described with reference to FIGS. 13 to 18. The optical head 1226 is electrically connected to the at least one circuit board 1230 either by a flexible tape 1232 having a plurality of wires or by a plurality of discrete wires (not illustrated).

The optical head 1226 is resiliently coupled to a body comprised of the housing 1200 and the at least one circuit board 1230. Preferably, the optical head 1226 is resiliently coupled to at least one of the housing 1200 and the at least one circuit board 1230 by a spring 1234. In an exemplary version of the second embodiment of the apparatus, the spring 1234 has a first end mounted to a back end of the optical head 1226 and a second end mounted to a post 1236 associated with the first housing portion 1202. Preferably, the post 1236 is integral with the first housing portion 1202.

Figure 32:
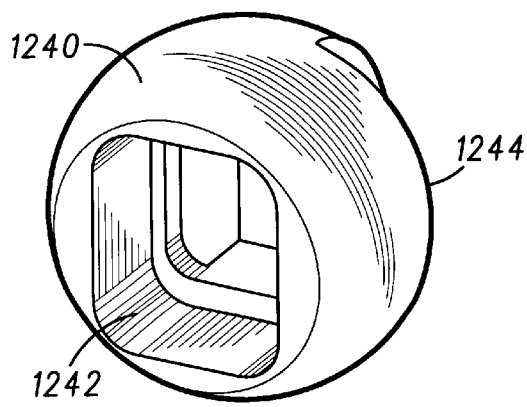
FIG. 32 is a first isometric view of a body of the optical head from the reading end.

FIG. 32 is a first isometric view of a body 1240 of the optical head 1226 from the reading end 1227. The body 1240 defines an inner region 1242 to support the housing 1229 having the emitter 54 and the detector 56. Preferably, the housing 1229 is based upon the housing 300 described with reference to FIG. 10. In particular, it is preferred that the housing 1229 provides two apertures as described with reference to FIG. 10.

The body 1240 defines a semi-spherical external surface 1244. In this application, the term "semi-spherical" is meant to define a shape generally consistent at least a portion of a sphere. Preferably, the body 1240 is fully contained within a spherical envelope defined by hypothetically extending the semi-spherical external surface 1244 to form an entire sphere.

Preferably, in a neighborhood of the code-reading aperture, the external surface of the housing 1229 has a radius of curvature greater than a radius of curvature of the semi-spherical external surface 1244 of the body 1240.

Figure 33:
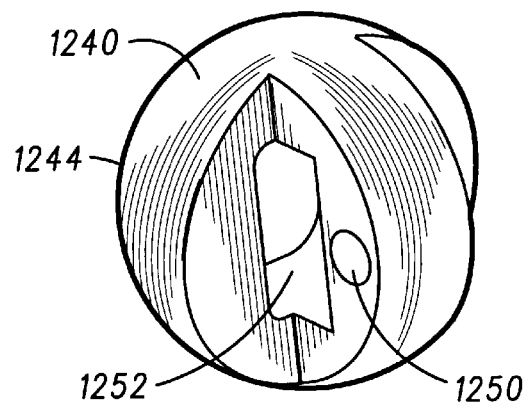
FIG. 33 is a second isometric view of the body of the optical head from the back end.

FIG. 33 is a second isometric view of the body 1240 of the optical head 1226 from the back end. The body 1240 defines a hole 1250 at the back end. The first end of the spring 1234 is looped through the hole 1250. The body 1240 further defines an opening 1252 through which an electrical connection, such as the flexible tape 1230, is made to the emitter 54 and the detector 56.

Figure 34:
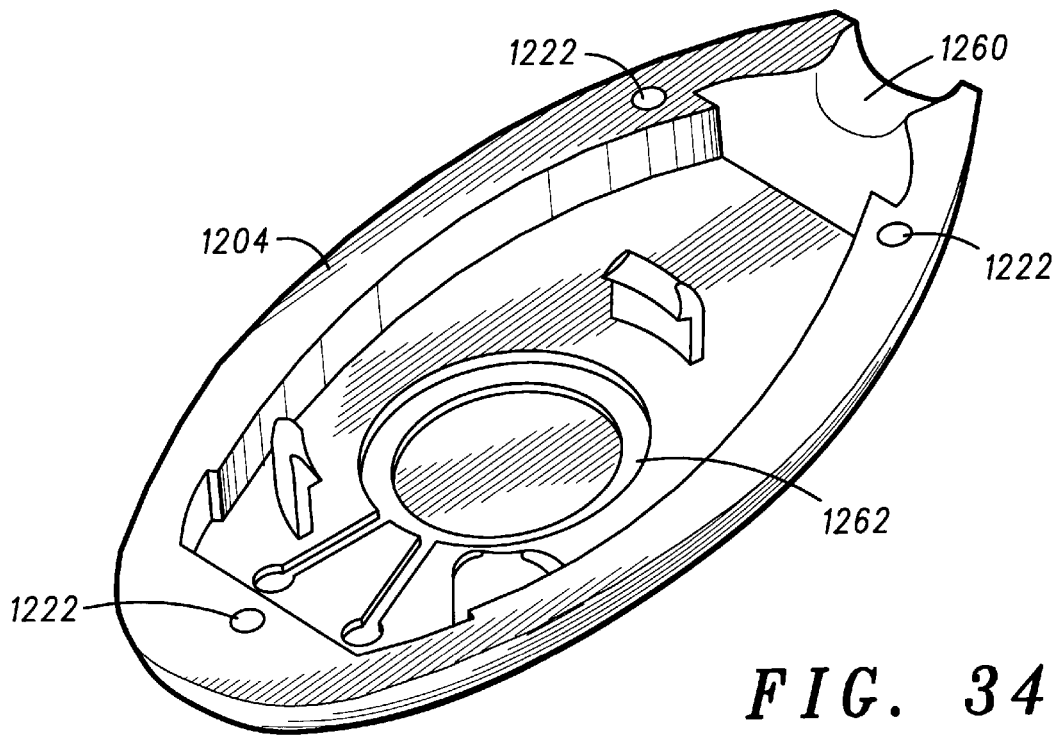
FIG. 34 is an isometric view of the second housing portion.

FIG. 34 is an isometric view of the second housing portion 1204. The second housing portion 1204 has a surface 1260 which defines a semi-spherical cavity to at least partially surround and support the optical head 1226. The second housing portion 1204 defines a chamber 1262 to house the first contact 600, the second contact 602, the audible indicator 502, the battery 412, and the battery spacer 604 in a manner described with reference to FIG. 19.

Figure 35:
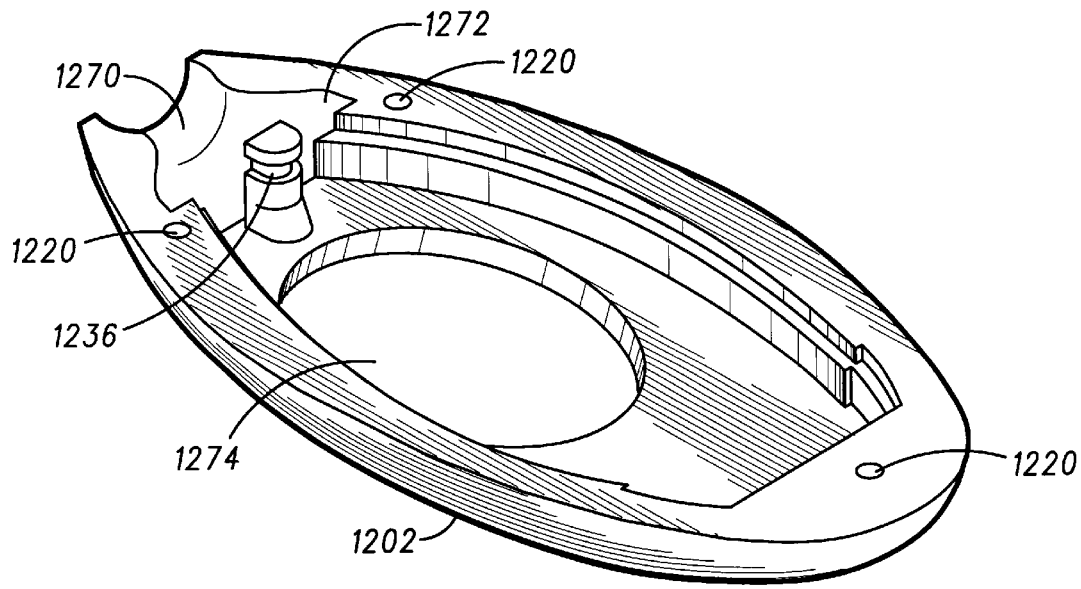
FIG. 35 is an isometric view of the first housing portion.

FIG. 35 is an isometric view of the first housing portion 1202. The first housing portion 1202 has a surface 1270 which defines a semi-spherical cavity to at least partially surround and support the optical head 1226. When the first housing portion 1202 is fit together with the second housing portion 1204, the surfaces 1260 and 1270 provide a bearing to receive and retain the semi-spherical external surface 1244 of the body 1240. As a result, the housing 1200 permits rotation of the optical head 1226 therein, but generally inhibits any significant translation of the optical head 1226 therein.

The post 1236 has a groove 1272 to receive the second end of the spring 1234. The spring 1234 acts to restrain the rotation of the optical head 1226 due to an external torque. The external torque is generated, for example, when the optical head 1226 is swiped across a contacting surface having the optical code 40. In this case, the one or more apertures of the optical head 1226 is re-oriented as the apparatus is swiped across the optical code 40. By re-orienting the optical head 1226 in this manner, the external surface of the housing 1229 of the optical head 1226 is substantially flush with the contacting surface having the optical code 40 the optical code 40 for a wider variation in orientation of the housing 1200. Advantageously, the optical code 40 can be accurately read for a wider variation in orientation of the housing 1200.

When the external torque is removed, the spring 1234 resiliently returns the optical head 1226 to substantially its initial orientation. The external torque is removed, for example, when the optical head 1226 is removed from the surface having the optical code 40.

The first housing portion 1202 defines an opening 1274 within which a button key top (not illustrated) is disposed. The button key top is to control the activation and deactivation of the optical reader as previously described herein.

It is noted that the second embodiment of the apparatus can be used in a manner described for the first embodiment of the apparatus.

Figure 36:
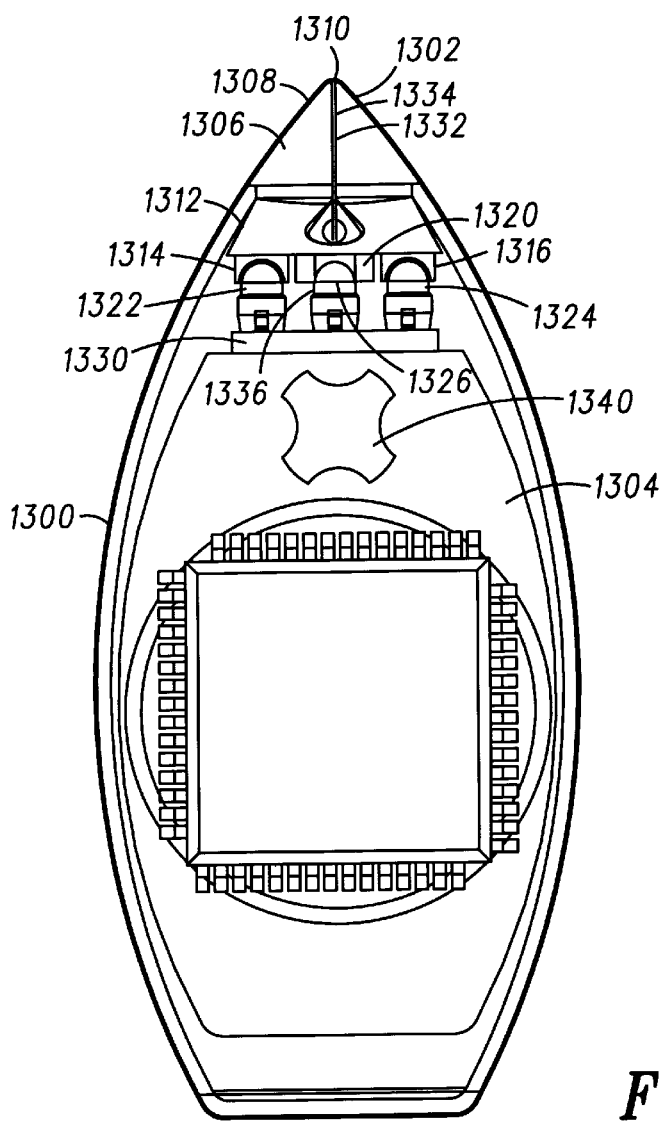
FIG. 36 is a view of a third embodiment of the apparatus.

FIG. 36 is a view of a third embodiment of the apparatus. The apparatus includes a housing 1300 which houses or otherwise supports an optical head 1302 and at least one circuit board 1304. The size and shape of the housing 1300 are amenable for grasping by an end user in a manner similar to grasping a writing implement such as a pen, a pencil, or a stylus. The size and shape of the housing 1300 are also amenable for carrying by the end user in a pocket or a purse.

The optical head 1302 has a body 1306. Preferably, the body 1306 is formed of a transparent or translucent acrylic material for communicating visible indications therethrough. The body 1306 has a first portion 1308 which generally increases in cross sectional area from a reading end 1310 toward the housing 1300. The body 1306 has a second portion 1312 housed within the housing 1300.

An optical coupler 1314, an optical coupler 1316, and an optical coupler 1320 are mechanically coupled to the second portion 1312. The optical coupler 1314 defines a cavity to surround at least a portion of a first emitter 1322. The optical coupler 1316 defines a cavity to surround at least a portion of a second emitter 1324. The optical coupler 1320 defines a cavity to surround at least a portion of a detector 1326. The optical couplers 1314, 1316, and 1320 are removable from the first emitter 1322, the second emitter 1324, and the detector 1326, respectively.

Preferably, the first emitter 1322 includes a visible light-emitting diode to provide one or more visual indications described for the visual indicator 76. Preferably, the second emitter 1324 includes an infrared light-emitting diode to transmit optical signals such as those described for the emitter 54. Preferably, the detector 1326 includes an infrared photodiode or an infrared phototransistor to optoelectronically sense optical signals such as those described for the detector 56. It is also preferred that the first emitter 1322, the second emitter 1324, and the detector 1326 are mounted to a support 1330 within the housing 1300.

The optical coupler 1314 couples light generated by the first emitter 1322 into the body 1306. Similarly, the optical coupler 1316 couples light generated by the second emitter 1324 into the body 1306.

Disposed within the body 1306 is an optical waveguide 1332. The optical waveguide 1332 provides a light communication path from the reading end 1310 to the detector-receiving member 1320. The optical coupler 1320 couples light from the optical waveguide 1332 to the detector 1326. Optionally, the optical waveguide 1332 includes an optical fiber 1334 which extends from the reading end 1310 to the detector-receiving member 1320. Alternatively, the optical waveguide 1332 can be fiberless.

The optical waveguide 1332 is optically shielded or isolated from the body 1306 such as by a metallized surface. As a result, light within the body 1306 is shielded from the detector 1326. The detector-receiving member 1320 includes a sleeve 1336 or like member to shield or isolate the detector 1326 from the first emitter 1322 and the second emitter 1324.

The second emitter 1324 and the detector 1326 communicate with a circuit supported by the at least one circuit board 1304 to read optical codes and to communicate optical data at the reading end 1310. The first emitter 1322 is responsive to the circuit to visually indicate a status of the apparatus to the end user. The at least one circuit board 1304 supports a switch 1340 to receive user actions.

Advantageously, the optical head 1302 is removable from the first emitter 1322, the second emitter 1324, and the detector 1326. As a result, the optical head 1302 can be replaced without having to replace the first emitter 1322, the second emitter 1324, or the detector 1326.

The herein-described embodiments of the apparatus can be used in a variety of applications. Of particular interest are electronic network navigation applications such as those described in the patent application entitled "Electronic Network Navigation Device and Method for Linking to an Electronic Address Therewith", having Ser. No. 08/710,820 which is hereby incorporated by reference into this disclosure. In these applications, the apparatus reads an optical code associated with a resource of an electronic network. For example, the apparatus can read a bar code associated with a Web page accessible via the Internet. The apparatus optically transmits a message based upon the optical code to a network access apparatus, such as a computer. Based upon the message, the network access apparatus links to the resource of the electronic network.

Thus, there has been described herein several embodiments including preferred embodiments of a optical code reader and methods and articles therefor.

By disabling an optical code reading feature but continuing to enable data communication features if the voltage level of the battery source is below a predetermined level, the remaining energy in the battery source can be dedicated to communicate previously-stored optical codes.

Advantageously, bar edges are detected using a software process performed by the microcontroller U1 instead of a hardware comparator. This approach may provide consistent results in high volume, and less may be expensive to manufacture.

The source code in the microfiche appendix is used to implement a presently preferred embodiment of the present invention. It will be appreciated that it is possible to implement embodiments of the present invention using different source code without departing from the scope of the present invention. Thus, the source code should not be construed to limit the invention defined in the appended claims. This source code is provided to illustrate the best mode currently known to the inventors to practice the present invention.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising the steps of:
providing an apparatus having an optical detector, an optical emitter, an amplifier, and an analog-to-digital converter, the amplifier having an input, an output, and a control input, the input responsive to the optical detector, the analog-to-digital converter responsive to the output;
illuminating the optical emitter;
setting a variable to digitally represent a time duration scaling factor;
reading a sample from the analog-to-digital converter;
if the sample is less than a first threshold, applying a first signal to the control input for a first duration based upon the variable; and
if the sample is greater than a second threshold, applying a second signal to the control input for a second duration based upon the variable.

2. The method of claim 1 wherein the first duration and the second duration are based upon a product of the variable and a constant.

3. The method of claim 1 wherein the first signal has a first voltage level, and the second signal has a second voltage level which differs from the first voltage level.

4. The method of claim 3 wherein the first voltage level is less than the second voltage level.

5. The method of claim 1 wherein the first threshold is less than the second threshold.

6. A method comprising the steps of:
providing an apparatus having an optical detector, an optical emitter, an amplifier, and an analog-to-digital converter, the amplifier having an input, an output, and a control input, the input responsive to the optical detector, the analog-to-digital converter responsive to the output;
illuminating the optical emitter;
reading a first sample from the analog-to-digital converter;
determining that the first sample is less than a first threshold;
upon determining that the first sample is less than the first threshold, applying a first signal to the control input for a first duration;
reading a second sample from the analog-to-digital converter;
determining that the second sample is greater than a second threshold; and
upon determining that the second sample is greater than the second threshold, applying a second signal to the control input for a second duration less than the first duration.

7. The method of claim 6 wherein the first signal has a first voltage level, and the second signal has a second voltage level which differs from the first voltage level.

8. The method of claim 7 wherein the first voltage level is less than the second voltage level.

9. The method of claim 6 wherein the first threshold is less than the second threshold.

10. The method of claim 6 wherein the second duration is about half of the first duration.

11. A method comprising the steps of:
providing an apparatus having an optical detector, an optical emitter, an amplifier, and an analog-to-digital converter, the amplifier having an input, an output, and a control input, the input responsive to the optical detector, the analog-to-digital converter responsive to the output;
illuminating the optical emitter;
reading a first sample from the analog-to-digital converter;
determining that the first sample is greater than a first threshold;
upon determining that the first sample is greater than the first threshold, applying a first signal to the control input for a first duration;
reading a second sample from the analog-to-digital converter;
determining that the second sample is less than a second threshold; and
upon determining that the second sample is less than the second threshold, applying a second signal to the control input for a second duration less than the first duration.

12. The method of claim 11 wherein the first signal has a first voltage level, and the second signal has a second voltage level which differs from the first voltage level.

13. The method of claim 12 wherein the second voltage level is less than the first voltage level.

14. The method of claim 11 wherein the second threshold is less than the first threshold.

15. The method of claim 11 wherein the second duration is about half of the first duration.

16. An apparatus comprising:
an optical detector;
an amplifier having an input, an output, and a control input, the input responsive to the optical detector;
an optical emitter;
an analog-to-digital converter responsive to the output of the amplifier; and
a processor responsive to the analog-to-digital converter, the processor to activate the optical emitter, to set a variable to digitally represent a time duration scaling factor, to read a sample from the analog-to-digital converter, to apply a first signal to the control input for a first duration based upon the variable if the sample is less than a first threshold, and to apply a second signal to the control input for a second duration based upon the variable if the sample is greater than a second threshold.

17. The apparatus of claim 16 wherein the first duration and the second duration are based upon a product of the variable and a constant.

18. The apparatus of claim 16 wherein the first signal has a first voltage level, and the second signal has a second voltage level which differs from the first voltage level.

19. The apparatus of claim 18 wherein the first voltage level is less than the second voltage level.

20. The apparatus of claim 16 wherein the first threshold is less than the second threshold.

21. The apparatus of claim 16 wherein the amplifier includes a capacitor having a first terminal coupled to the input and a second terminal coupled to the control input by a resistor.

22. An apparatus comprising:

an optical detector;

an amplifier having an input, an output, and a control input, the input responsive to the optical detector;

an optical emitter;

an analog-to-digital converter responsive to the output of the amplifier; and a processor responsive to the analog-to-digital converter, the processor to activate the optical emitter, to read a first sample from the analog-to-digital converter, to apply a first signal to the control input for a first duration upon determining that the first sample is less than a first threshold, to read a second sample from the analog-to-digital converter, and to apply a second signal to the control input for a second duration less than the first duration upon determining that the second sample is greater than a second threshold.

23. The apparatus of claim 22 wherein the first signal has a first voltage level, and the second signal has a second voltage level which differs from the first voltage level.

24. The apparatus of claim 23 wherein the first voltage level is less than the second voltage level.

25. The apparatus of claim 22 wherein the first threshold is less than the second threshold.

26. The apparatus of claim 22 wherein the second duration is about half of the first duration.

27. The apparatus of claim 22 wherein the amplifier includes a capacitor having a first terminal coupled to the input and a second terminal coupled to the control input by a resistor.

28. An apparatus comprising:

an optical detector;

an amplifier having an input, an output, and a control input, the input responsive to the optical detector;

an optical emitter;

an analog-to-digital converter responsive to the output of the amplifier; and a processor responsive to the analog-to-digital converter, the processor to activate the optical emitter, to read a first sample from the analog-to-digital converter, to apply a first signal to the control input for a first duration upon determining that the first sample is greater than a first threshold, to read a second sample from the analog-to-digital converter, and to apply a second signal to the control input for a second duration less than the first duration upon determining that the second sample is less than the second threshold.

29. The apparatus of claim 28 wherein the first signal has a first voltage level, and the second signal has a second voltage level which differs from the first voltage level.

30. The apparatus of claim 29 wherein the second voltage level is less than the first voltage level.

31. The apparatus of claim 28 wherein the second threshold is less than the first threshold.

32. The apparatus of claim 28 wherein the second duration is about half of the first duration.

33. The apparatus of claim 28 wherein the amplifier includes a capacitor having a first terminal coupled to the input and a second terminal coupled to the control input by a resistor.

* * * * *